US012654741B2

(12) United States Patent
Kai et al.

(10) Patent No.: US 12,654,741 B2
(45) Date of Patent: Jun. 16, 2026

(54) DRIVING POLICY DETERMINING METHOD AND APPARATUS, DEVICE, AND VEHICLE

(71) Applicant: Yinwang Intelligent Technologies Co., Ltd., Shenzhen (CN)

(72) Inventors: Shixiong Kai, Beijing (CN); Bin Wang, Beijing (CN); Wulong Liu, Montreal (CA)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 18/521,128

(22) Filed: Nov. 28, 2023

(65) Prior Publication Data

US 2024/0092385 A1    Mar. 21, 2024

Related U.S. Application Data

(63) Continuation of application No. PCT/CN2021/096781, filed on May 28, 2021.

(51) Int. Cl.
B60W 60/00        (2020.01)
B60W 30/09        (2012.01)
(Continued)

(52) U.S. Cl.
CPC ........ B60W 60/0011 (2020.02); B60W 30/09 (2013.01); B60W 30/0956 (2013.01);
(Continued)

(58) Field of Classification Search
CPC ............. B60W 60/0011; B60W 30/09; B60W 30/0956; B60W 30/18159; B60W 40/04;
(Continued)

(56) References Cited

U.S. PATENT DOCUMENTS 9,248,834 B1 *   2/2016   Ferguson .............. B60W 30/09
2009/0088916 A1 *   4/2009   Elgersma .............. G05D 1/106
701/23

(Continued)

FOREIGN PATENT DOCUMENTS

CN        109557925  A    4/2019
CN        110111605  A    8/2019

OTHER PUBLICATIONS

Nan Li, et al., "Game-Theoretic Modeling of Multi-Vehicle Interactions at Uncontrolled Intersections," Apr. 10, 2019, 18 pages.

*Primary Examiner* — Jelani A Smith
*Assistant Examiner* — Dana D Ivey
(74) *Attorney, Agent, or Firm* — Conley Rose, P.C.

(57)        ABSTRACT

In a driving policy determining method, for each object, a first target motion trajectory of the object is calculated on a premise that the object does not collide with another object that moves based on an initial motion trajectory. Then, for the ego vehicle, a second target motion trajectory of the ego vehicle is calculated on a premise that the ego vehicle does not collide with another object that moves based on a first target motion trajectory. Then, a driving policy is determined based on the second target motion trajectory of the ego vehicle and a first target motion trajectory of at least one game object. The foregoing operations are repeated until the determined driving policy matches an initial driving policy.

20 Claims, 5 Drawing Sheets

(51) Int. Cl.

| | |
|---|---|
| *B60W 30/095* | (2012.01) |
| *B60W 30/18* | (2012.01) |
| *B60W 40/04* | (2006.01) |
| *B60W 40/06* | (2012.01) |
| *B60W 40/105* | (2012.01) |

(52) U.S. Cl.
CPC ...... *B60W 30/18159* (2020.02); *B60W 40/04* (2013.01); *B60W 40/06* (2013.01); *B60W 40/105* (2013.01); *B60W 60/00274* (2020.02); *B60W 2554/4041* (2020.02); *B60W 2554/4045* (2020.02); *B60W 2554/406* (2020.02); *B60W 2556/10* (2020.02)

(58) Field of Classification Search
CPC .............. B60W 40/06; B60W 40/105; B60W 60/00274; B60W 2554/4041; B60W 2554/4045; B60W 2554/406; B60W 2556/10; B60W 2520/10; B60W 2554/402; B60W 2554/4042
USPC .......................................................... 701/25
See application file for complete search history.

(56) References Cited

U.S. PATENT DOCUMENTS

| | | | | |
|---|---|---|---|---|
| 2020/0241545 A1* | 7/2020 | Anthony | .............. | G05D 1/0088 |
| 2020/0247432 A1* | 8/2020 | Misra | ................ | B60W 50/0097 |
| 2020/0255026 A1* | 8/2020 | Katardjiev | ....... | G08G 1/096741 |

* cited by examiner

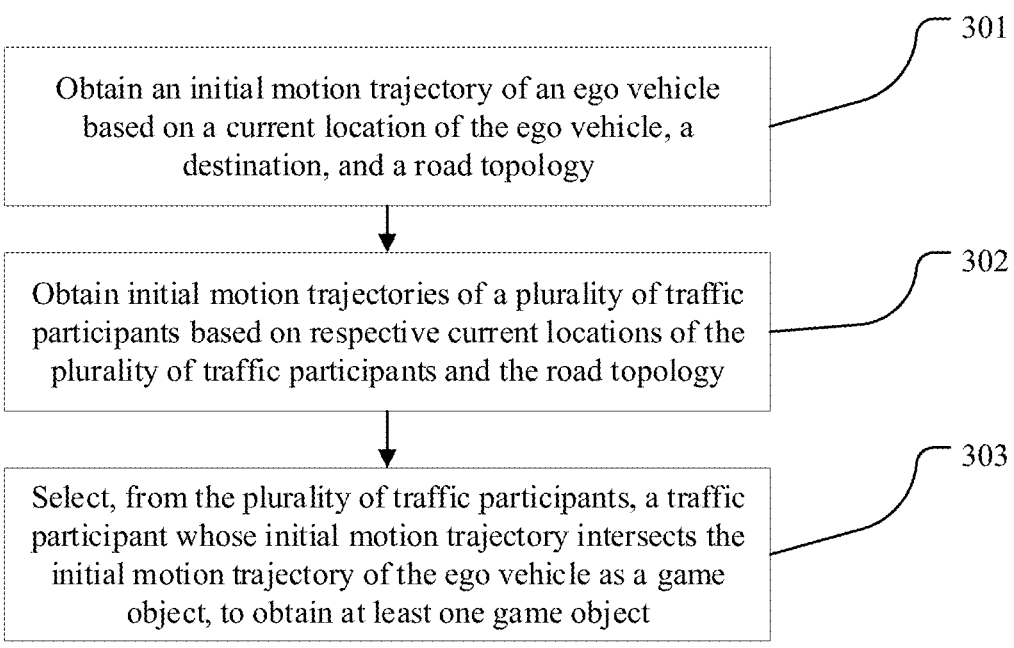

| |
|---|
| Obtain an initial motion trajectory of an ego vehicle based on a current location of the ego vehicle, a destination, and a road topology |

301

| |
|---|
| Obtain initial motion trajectories of a plurality of traffic participants based on respective current locations of the plurality of traffic participants and the road topology |

302

| |
|---|
| Select, from the plurality of traffic participants, a traffic participant whose initial motion trajectory intersects the initial motion trajectory of the ego vehicle as a game object, to obtain at least one game object |

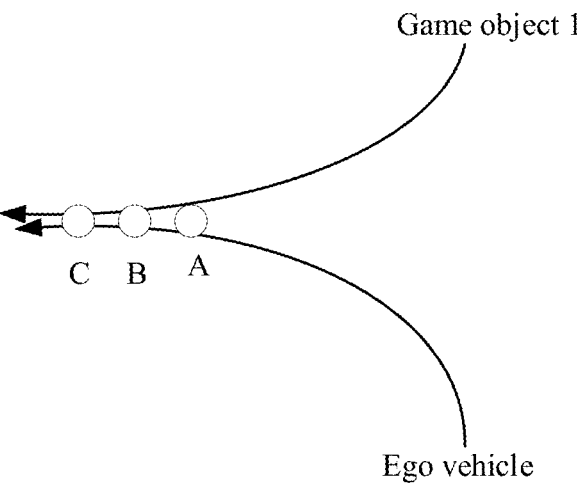

Game object 1

C    B    A

Ego vehicle

FIG. 5

DRIVING POLICY DETERMINING METHOD AND APPARATUS, DEVICE, AND VEHICLE

CROSS-REFERENCE TO RELATED APPLICATIONS

This is a continuation of International Patent Application No. PCT/CN2021/096781 filed on May 28, 2021, the disclosure of which is hereby incorporated by reference in its entirety.

TECHNICAL FIELD

Embodiments of this application relate to the field of self-driving technologies, furthermore, to a driving policy determining method and apparatus, a device, and a vehicle.

BACKGROUND

With the development of artificial intelligence technologies, a self-driving technology gradually becomes mature. The self-driving technology enables computer to automatically and safely operate a motor vehicle without any human operation based on collaboration of artificial intelligence, visual computing, a radar, a monitoring apparatus, a global positioning system, and the like.

Whether the self-driving technology is advanced depends on effectiveness of a driving policy. Currently, a driving policy determining method is to determine a driving policy by calculating a distance and a relative location between an ego vehicle and another vehicle.

However, the driving policy determined by using the method is applicable only at a current moment, and is not so effective.

SUMMARY

Embodiments of this application provide a driving policy determining method and apparatus, a device, and a vehicle. In the driving policy determining method, a dynamic game solving method is used, so that an effective driving policy can be determined.

A first aspect of embodiments of this application provides a policy determining method, including: determining, for each of a plurality of objects, a first target sequence that satisfies a first condition, where the first target sequence includes values of a motion parameter at a plurality of first moments after the object starts from a current location of the object, the plurality of first moments may be set based on an actual requirement, time intervals between two adjacent first moments of the plurality of first moments may be the same or different, the first condition is that the object does not collide, in a process of moving from a current location of the object based on a current speed and the first target sequence, with other objects that is in the plurality of objects and that moves based on an initial motion trajectory, that the object does not collide with the other objects may be understood as that a distance between locations of the object and the another object at a same moment is greater than a specified distance, it may be understood that the object and the another object are not at a same location at the same time when the specified distance is 0, the initial motion trajectory includes locations of the another object at a plurality of second moments, the plurality of second moments may be set based on an actual requirement, time intervals between two adjacent second moments of the plurality of second moments may be the same or different, the plurality of objects include an ego vehicle and at least one game object, and the game object may be understood as another traffic participant other than the ego vehicle; calculating a first target motion trajectory generated when each object moves from the current location of the object based on the current speed and the corresponding first target sequence, where the first target motion trajectory includes locations of the object at the plurality of second moments; determining, for the ego vehicle, a second target sequence that satisfies a second condition, where a process of determining the second target sequence is similar to a process of determining the first target sequence, the second target sequence includes values of a motion parameter at the plurality of first moments after the ego vehicle starts from a current location of the ego vehicle, the second condition is that the ego vehicle does not collide, in a process of moving from the current location of the ego vehicle based on a current speed and the second target sequence, with the at least one game object that moves based on a first target motion trajectory of the at least one game object, and for a meaning of that the ego vehicle does not collide with the at least one game object, reference may be made to the foregoing descriptions for understanding; calculating a second target motion trajectory generated when the ego vehicle moves from the current location of the ego vehicle based on the current speed and the second target sequence, where the second target motion trajectory includes locations of the ego vehicle at the plurality of second moments; determining a driving policy of the ego vehicle in current iterative calculation based on the second target motion trajectory of the ego vehicle and a first target motion trajectory of the at least one game object, where the driving policy may contain a plurality of types of content, for example, the driving policy is one of non-yielding, yielding, or car-following, and in addition, the driving policy may be driving at a constant speed, driving at a constant acceleration, or the like; repeatedly performing the foregoing operations until the driving policy of the ego vehicle in current iterative calculation matches an initial driving policy, that is, the driving policy of the ego vehicle converges, where there are two cases in which the driving policy in current iterative calculation matches the initial driving policy: One case is that the driving policy in current iterative calculation is the same as the initial driving policy, and the other case is that a difference between a parameter value included in the driving policy in current iterative calculation and a parameter value included in the initial driving policy is less than a third threshold. The third threshold may be set based on an actual requirement.

In the policy determining method provided in embodiments of this application, a dynamic game method is used. In a dynamic game process, the ego vehicle and the game object are treated equally, that is, both are used as objects in a game, to determine the first target motion trajectories of the ego vehicle and the game object. In this way, the determined first target motion trajectories of the ego vehicle and the game object are results obtained in consideration of perspectives of the ego vehicle and the game object, and are more accurate, and the second target motion trajectory of the ego vehicle determined based on the first target motion trajectory of the game object is more accurate. Therefore, the driving policy determined based on the second target motion trajectory of the ego vehicle and the first target motion trajectory of the game object is more effective.

In the dynamic game process, both the ego vehicle and the game object are used as the objects, so that in embodiments of this application, not only interaction between the ego vehicle and the game object is considered, but also interaction between a plurality of game objects is considered when there is the plurality of game objects. Therefore, embodiments of this application are not only applicable to determining a driving policy between the ego vehicle and a single game object, but also applicable to determining a driving policy between the ego vehicle and a plurality of game objects. In addition, when there are a plurality of game objects, in embodiments of this application, the driving policy may be determined at a time in consideration of all the game objects, and a driving policy between the ego vehicle and each game object does not need to be determined one by one. Therefore, a problem that a determined driving policy between the ego vehicle and one game object conflicts with a determined driving policy between the ego vehicle and another game object can be avoided.

In addition, in embodiments of this application, the foregoing operations are repeatedly performed until the driving policy of the ego vehicle in current iterative calculation matches the initial driving policy. To be specific, the driving policy is determined through iterative calculation. Therefore, calculation complexity in a driving policy determining process is reduced.

In an implementation, the motion parameter is an acceleration.

This implementation provides a specific implementation of the motion parameter.

In an implementation, a type of the at least one game object includes at least one of a pedestrian, a motor vehicle, and a non-motor vehicle. The motor vehicle may include a plurality of types such as an automobile and a truck. The non-motor vehicle may include a bicycle, an electric vehicle, and other types.

This implementation provides a plurality of possible types of the at least one game object, so that application scenarios of embodiments of this application are enriched.

In an implementation, an initial motion trajectory of the ego vehicle is planned based on the current location of the ego vehicle, a destination, and a road topology. The road topology may be understood as a diagram of a relationship between roads. An initial motion trajectory of each of the at least one game object is determined based on a current location of each of the at least one game object and the road topology.

This implementation is applicable to a case in which current iterative calculation is first iterative calculation.

In an implementation, respective initial motion trajectories of the plurality of objects are respective first target motion trajectories of the plurality of target objects obtained through previous iterative calculation of current iterative calculation.

This implementation is applicable to a case in which current iterative calculation is $N^{th}$ iterative calculation, where N is an integer greater than 1.

In an implementation, the driving policy is one of non-yielding, yielding, or car-following.

This implementation provides a plurality of possibilities of the driving policy, so that embodiments of this application can be applied to a plurality of scenes.

In an implementation, the initial driving policy is a driving policy in previous iterative calculation of current iterative calculation.

This implementation is applicable to a case in which current iterative calculation is $N^{th}$ iterative calculation, where N is an integer greater than 1.

In an implementation, the determining, for each of a plurality of objects, a first target sequence that satisfies a first condition includes: obtaining, for each of the plurality of objects, a plurality of first action sequences, where each of the plurality of first action sequences includes the values of the motion parameter at the plurality of first moments after the object starts from the current location of the object; and selecting, from the plurality of first action sequences, a first action sequence that satisfies the first condition as the first target sequence.

The plurality of first action sequences are first obtained. Then, the first action sequence that satisfies the first condition is selected as the first target sequence. The plurality of first action sequences provide a plurality of choices of the first target sequence, so that it can be ensured that the selected first target sequence is a better action sequence.

In an implementation, the selecting, from the plurality of first action sequences, a first action sequence that satisfies the first condition as the first target sequence includes: calculating a score of each of the plurality of first action sequences, where the score may also be referred to as a reward value, there are a plurality of methods for calculating the score, and this is not limited in embodiments of this application; and selecting, from the plurality of first action sequences, a first action sequence that satisfies the first condition and whose score is greater than a first threshold as the first target sequence. The first threshold may be set based on an actual requirement.

The first target sequence is selected by calculating the scores of the first action sequences, so that it can be ensured that the selected first target sequence is a better action sequence.

In an implementation, the calculating a score of each of the plurality of first action sequences includes: for each of the plurality of first action sequences, calculating, based on the first action sequence, a difference between accelerations of the object at two adjacent first moments of the plurality of first moments; and calculating the score of each first action sequence based on the difference between the accelerations at the two adjacent first moments of the plurality of first moments.

The difference between the accelerations at the two adjacent first moments can reflect comfort of self-driving. Therefore, in this implementation, the score of the first action sequence is calculated based on the difference between the accelerations at the two adjacent first moments. In this way, the first target sequence selected based on the score can ensure comfort of a user in a self-driving process.

In an implementation, the motion parameter is the acceleration. Correspondingly, the calculating a score of each of the plurality of first action sequences includes: calculating the score of each first action sequence based on a value of the acceleration that is included in each of the plurality of first action sequences and that is at each first moment.

The value of the acceleration at the first moment can reflect a high speed of self-driving. Therefore, in this implementation, the score of the first action sequence is calculated based on the value of the acceleration at the first moment. In this way, the first target sequence selected based on the score can meet a speed requirement in the self-driving process.

In an implementation, the obtaining, for each of the plurality of objects, a plurality of first action sequences includes: for each of the plurality of objects, obtaining, based on a plurality of first reference values of the motion parameter, the plurality of first action sequences that satisfy a fourth condition. The value of the motion parameter included in each first action sequence belongs to the plurality of first reference values. The plurality of first reference values may be set based on factors such as a type of the object. There may be a plurality of fourth conditions. This is not limited in embodiments of this application.

In this implementation, the plurality of first action sequences are obtained based on the fourth condition, so that the first action sequences are preliminarily selected in a process of obtaining the first action sequences. Therefore, it can be further ensured that the first target sequence selected based on the plurality of first action sequences is a better action sequence.

In an implementation, the fourth condition includes at least one of the following conditions: a value range of the acceleration of the object at each of the plurality of first moments, a value range of a speed of the object at each first moment, and a range of the difference between the accelerations of the object at the two adjacent first moments of the plurality of first moments. The acceleration of the object at each first moment, the speed of the object at each first moment, and the difference between the accelerations of the object at the two adjacent first moments of the plurality of first moments are determined based on the first action sequence. For the ego vehicle and a traffic participant, the value of the acceleration, the value of the speed, and the difference between the accelerations at the two adjacent first moments have a specific range, and may be determined based on one or more factors.

This implementation provides a plurality of possible choices of the fourth condition. The fourth condition can ensure that the value of the motion parameter included in the obtained first action sequence meets an actual requirement.

In an implementation, the value range of the acceleration of the object at each first moment is determined based on the type of the object. The type of the object may be a pedestrian, a motor vehicle, or a non-motor vehicle. For example, when the object is a motor vehicle, the value range of the acceleration at the first moment may be $[-4, 3]$ meters per second squared (m/s^2); when the object is a bicycle, the value range of the acceleration at the first moment may be $[-2, 2]$ m/s^2; or when the object is a pedestrian, the value range of the acceleration at the first moment may be $[-0.5, 0.8]$ m/s^2.

Different types of objects have different capabilities, and can provide different accelerations. Therefore, the value range of the acceleration of the object at the first moment is determined based on the type of the object. In this way, the first action sequence selected based on the value range of the acceleration of the object at the first moment matches a capability of the object of this type.

In an implementation, the value range of the speed of the object at each first moment is determined based on the type of the object and/or intention information of a motion of the object. The type of the object may be a pedestrian, a motor vehicle, or a non-motor vehicle. There may be a plurality of types of intention information of the motion of the object. This is not limited in embodiments of this application.

Different types of objects have different capabilities, and can provide different speeds. Therefore, the value range of the speed of the object at the first moment is determined based on the type of the object. In this way, the first action sequence selected based on the value range of the speed of the object at the first moment matches the capability of the object of this type. In addition, different intention information has different speed requirements. Therefore, the value range of the speed of the object at the first moment is determined based on the intention information of the motion of the object. In this way, the first action sequence selected based on the value range of the speed of the object at the first moment meets a requirement of the intention information.

In an implementation, the intention information of the motion of the object includes at least one of turning left at an intersection, turning right at the intersection, going straight at the intersection, entering a roundabout, and leaving the roundabout.

This implementation provides a plurality of choices of the intention information.

In an implementation, the determining, for the ego vehicle, a second target sequence that satisfies a second condition includes: obtaining, for the ego vehicle, a plurality of second action sequences, where each of the plurality of second action sequences includes the values of the motion parameter at the plurality of first moments after the ego vehicle starts from the current location of the ego vehicle; and selecting, from the plurality of second action sequences, a second action sequence that satisfies the second condition as the second target sequence.

The plurality of second action sequences are first obtained. Then, the second action sequence that satisfies the first condition is selected as the first target sequence. The plurality of second action sequences provide a plurality of choices of the second target sequence, so that it can be ensured that the selected second target sequence is a better action sequence.

In an implementation, the selecting, from the plurality of second action sequences, a second action sequence that satisfies the second condition as the second target sequence includes: calculating a score of each of the plurality of second action sequences, where the score may also be referred to as a reward value, there are a plurality of methods for calculating the score, and this is not limited in embodiments of this application; and selecting, from the plurality of second action sequences, a second action sequence that satisfies the second condition and whose score is greater than a second threshold as the second target sequence. The second threshold may be set based on an actual requirement. The second threshold may be the same as the first threshold, or may be different from the first threshold.

The second target sequence is selected by calculating the scores of the second action sequences, so that it can be ensured that the selected second target sequence is a better action sequence.

In an implementation, the calculating a score of each of the plurality of second action sequences includes: for each of the plurality of second action sequences, calculating, based on the second action sequence, a difference between accelerations of the ego vehicle at two adjacent first moments of the plurality of first moments; and calculating the score of each second action sequence based on the difference between the accelerations at the two adjacent first moments of the plurality of first moments.

The difference between the accelerations at the two adjacent first moments can reflect comfort of self-driving. Therefore, in this implementation, the score of the second action sequence is calculated based on the difference between the accelerations at the two adjacent first moments. In this way, the second target sequence selected based on the score can ensure comfort of the user in the self-driving process.

In an implementation, the motion parameter is the acceleration. Correspondingly, the calculating a score of each of the plurality of second action sequences includes: calculating the score of each second action sequence based on a value of the acceleration that is included in each of the plurality of first action sequences and that is at each first moment.

The value of the acceleration at the first moment can reflect a high speed of self-driving. Therefore, in this implementation, the score of the second action sequence is calculated based on the value of the acceleration at the first moment. In this way, the second target sequence selected based on the score can meet the speed requirement in the self-driving process.

In an implementation, the obtaining, for the ego vehicle, a plurality of second action sequences includes: for the ego vehicle, obtaining, based on a plurality of second reference values of the motion parameter, the plurality of second action sequences that satisfy a sixth condition. The value of the motion parameter included in each second action sequence belongs to the plurality of second reference values. The plurality of second reference values may be set based on factors such as a motor vehicle type of the ego vehicle. There may be a plurality of sixth conditions. This is not limited in embodiments of this application.

In this implementation, the plurality of second action sequences are obtained based on the sixth condition, so that the second action sequences are preliminarily selected in a process of obtaining the second action sequences. Therefore, it can be further ensured that the second target sequence selected based on the plurality of second action sequences is a better action sequence.

In an implementation, the sixth condition includes at least one of the following conditions: a value range of the acceleration of the ego vehicle at each of the plurality of first moments, a value range of a speed of the ego vehicle at each first moment, and a range of the difference between the accelerations of the ego vehicle at the two adjacent first moments of the plurality of first moments. The acceleration of the ego vehicle at each first moment, the speed of the ego vehicle at each first moment, and the difference between the accelerations of the ego vehicle at the two adjacent first moments of the plurality of first moments are determined based on the second action sequence. For the ego vehicle and the traffic participant, the value of the acceleration, the value of the speed, and the difference between the accelerations at the two adjacent first moments have a specific range, and may be determined based on one or more factors.

This implementation provides a plurality of possible choices of the fourth condition. The fourth condition can ensure that the value of the motion parameter included in the obtained second action sequence meets an actual requirement.

In an implementation, the value range of the acceleration of the ego vehicle at each first moment is determined based on the motor vehicle type.

Different types of objects have different capabilities, and can provide different accelerations. The ego vehicle is a motor vehicle. Therefore, the value range of the acceleration of the ego vehicle at the first moment is determined based on the motor vehicle type. In this way, the first action sequence selected based on the value range of the acceleration of the ego vehicle at the first moment matches a capability of the motor vehicle.

In an implementation, the value range of the speed of the ego vehicle at each first moment is determined based on the motor vehicle type and/or intention information of a motion of the ego vehicle.

Different types of objects have different capabilities, and can provide different speeds. The ego vehicle is a motor vehicle. Therefore, the value range of the speed of the ego vehicle at the first moment is determined based on the motor vehicle type. In this way, the first action sequence selected based on the value range of the speed of the ego vehicle at the first moment matches the capability of the motor vehicle. In addition, different intention information has different speed requirements. Therefore, the value range of the speed of the ego vehicle at the first moment is determined based on the intention information of the motion of the ego vehicle. In this way, the first action sequence selected based on the value range of the speed of the ego vehicle at the first moment meets a requirement of the intention information.

In an implementation, the intention information of the motion of the ego vehicle includes at least one of turning left at the intersection, turning right at the intersection, going straight at the intersection, entering the roundabout, and leaving the roundabout.

This implementation provides a plurality of choices of the intention information.

In an implementation, before the determining, for each of a plurality of objects, a first target sequence that satisfies a first condition, the method further includes: obtaining the initial motion trajectory of the ego vehicle based on the current location of the ego vehicle, the destination, and the road topology, where the current location of the ego vehicle and the road topology may be obtained in advance, the initial motion trajectory of the ego vehicle may be represented in a plurality of manners, for example, may be represented by a line on a map, or may be represented by a group of road points (indicating locations of the ego vehicle at a plurality of moments) with timestamps, the timestamps of the road points may be set based on an actual requirement, which is not limited in embodiments of this application, and time intervals between timestamps of adjacent road points may be the same or different; obtaining initial motion trajectories of a plurality of traffic participants based on respective current locations of the plurality of traffic participants and the road topology, where the respective current locations of the traffic participants may be obtained by using a sensor, the initial motion trajectory of the traffic participant may be similarly represented in a plurality of manners, for example, may be represented by a line on the map, or may be represented by a group of road points with timestamps (indicating locations of the traffic participant at a plurality of moments), and time intervals between timestamps of adjacent road points may be the same or different; and selecting, from the plurality of traffic participants, a traffic participant whose initial motion trajectory intersects the initial motion trajectory of the ego vehicle as a game object, to obtain the at least one game object.

There are a plurality of methods for determining whether the initial motion trajectory of the ego vehicle intersects the initial motion trajectory of the traffic participant. This may be related to a method for representing the initial motion trajectory. For example, if the initial motion trajectory is represented by a line, whether the initial motion trajectory of the ego vehicle intersects the initial motion trajectory of the traffic participant may be determined by determining whether a line corresponding to the ego vehicle intersects a line corresponding to the traffic participant on the map. For another example, if the initial motion trajectory is represented by a group of road points with timestamps, whether the initial motion trajectory of the ego vehicle intersects the initial motion trajectory of the traffic participant may be determined by determining whether there is a same road point with a same timestamp for the ego vehicle and the traffic participant (that is, determining whether the ego vehicle and the traffic participant are at a same location at a same moment).

In this implementation, the traffic participant whose initial motion trajectory intersects the initial motion trajectory of the ego vehicle is selected from the plurality of traffic participants as the game object, to obtain the at least one game object. Therefore, a traffic participant for which there is no collision possibility can be removed, to prevent an unnecessary traffic participant from being used as a game object in the game, and policy determining efficiency can be improved.

A second aspect of embodiments of this application provides a policy determining apparatus, including: a first determining unit, configured to determine, for each of a plurality of objects, a first target sequence that is of the object and that satisfies a first condition, where the first target sequence includes values of a motion parameter at a plurality of first moments after the object starts from a current location of the object, the first condition is that the object does not collide, in a process of moving from the current location of the object based on a current speed and the first target sequence, with another object that is in the plurality of objects and that moves based on an initial motion trajectory of the another object, the initial motion trajectory includes locations of the another object at a plurality of second moments, and the plurality of objects include an ego vehicle and at least one game object; a calculation unit, configured to calculate a first target motion trajectory generated when each object moves from the current location of the object based on the current speed and the corresponding first target sequence, where the first target motion trajectory includes locations of the object at the plurality of second moments; the first determining unit is further configured to determine, for the ego vehicle, a second target sequence that satisfies a second condition, where the second target sequence includes values of a motion parameter at the plurality of first moments after the ego vehicle starts from a current location of the ego vehicle, and the second condition is that the ego vehicle does not collide, in a process of moving from the current location of the ego vehicle based on a current speed and the second target sequence, with the at least one game object that moves based on a first target motion trajectory of the at least one game object; and the calculation unit is further configured to calculate a second target motion trajectory generated when the ego vehicle moves from the current location of the ego vehicle based on the current speed and the second target sequence, where the second target motion trajectory includes locations of the ego vehicle at the plurality of second moments; and a second determining unit, configured to determine a driving policy of the ego vehicle in current iterative calculation based on the second target motion trajectory of the ego vehicle and the first target motion trajectory of the at least one game object.

In an implementation, the motion parameter is an acceleration.

In an implementation, a type of the at least one game object includes at least one of a pedestrian, a motor vehicle, and a non-motor vehicle.

In an implementation, an initial motion trajectory of the ego vehicle is planned based on the current location of the ego vehicle, a destination, and a road topology. An initial motion trajectory of each of the at least one game object is determined based on a current location of each of the at least one game object and the road topology.

In an implementation, respective initial motion trajectories of the plurality of objects are respective first target motion trajectories of the plurality of target objects obtained through previous iterative calculation of current iterative calculation.

In an implementation, the driving policy is one of non-yielding, yielding, or car-following.

In an implementation, the initial driving policy is a driving policy in previous iterative calculation of current iterative calculation.

In an implementation, the first determining unit is configured to: obtain, for each of the plurality of objects, a plurality of first action sequences, where each of the plurality of first action sequences includes the values of the motion parameter at the plurality of first moments after the object starts from the current location of the object; and select, from the plurality of first action sequences, a first action sequence that satisfies the first condition as the first target sequence.

In an implementation, the first determining unit is configured to: calculate a score of each of the plurality of first action sequences; and select, from the plurality of first action sequences, a first action sequence that satisfies the first condition and whose score is greater than a first threshold as the first target sequence.

In an implementation, the first determining unit is configured to: for each of the plurality of first action sequences, calculate, based on the first action sequence, a difference between accelerations of the object at two adjacent first moments of the plurality of first moments; and calculate the score of each first action sequence based on the difference between the accelerations at the two adjacent first moments of the plurality of first moments.

In an implementation, the motion parameter is the acceleration. The first determining unit is configured to calculate the score of each first action sequence based on a value of the acceleration that is included in each of the plurality of first action sequences and that is at each first moment.

In an implementation, the first determining unit is configured to: for each of the plurality of objects, obtain, based on a plurality of first reference values of the motion parameter, the plurality of first action sequences that satisfy a fourth condition. The value of the motion parameter included in each first action sequence belongs to the plurality of first reference values.

In an implementation, the fourth condition includes at least one of the following conditions: a value range of the acceleration of the object at each of the plurality of first moments, a value range of a speed of the object at each first moment, and a range of the difference between the accelerations of the object at the two adjacent first moments of the plurality of first moments. The acceleration of the object at each first moment, the speed of the object at each first moment, and the difference between the accelerations of the object at the two adjacent first moments of the plurality of first moments are determined based on the first action sequence.

In an implementation, the value range of the acceleration of the object at each first moment is determined based on a type of the object.

In an implementation, the value range of the speed of the object at each first moment is determined based on the type of the object and/or intention information of a motion of the object.

In an implementation, the intention information of the motion of the object includes at least one of turning left at an intersection, turning right at the intersection, going straight at the intersection, entering a roundabout, and leaving the roundabout.

In an implementation, the first determining unit is configured to: obtain, for the ego vehicle, a plurality of second action sequences, where each of the plurality of second action sequences includes the values of the motion parameter at the plurality of first moments after the ego vehicle starts from the current location of the ego vehicle; and select, from the plurality of second action sequences, a second action sequence that satisfies the second condition as the second target sequence.

In an implementation, the first determining unit is configured to: calculate a score of each of the plurality of second action sequences; and select, from the plurality of second action sequences, a second action sequence that satisfies the second condition and whose score is greater than a second threshold as the second target sequence.

In an implementation, the first determining unit is configured to: for each of the plurality of second action sequences, calculate, based on the second action sequence, a difference between accelerations of the object at two adjacent first moments of the plurality of first moments; and calculate the score of each second action sequence based on the difference between the accelerations at the two adjacent first moments of the plurality of first moments.

In an implementation, the motion parameter is the acceleration. The first determining unit is configured to calculate the score of each second action sequence based on a value of the acceleration that is included in each of the plurality of second action sequences and that is at each first moment.

In an implementation, the plurality of second action sequences that satisfy a sixth condition are obtained for the ego vehicle based on a plurality of second reference values of the motion parameter. The value of the motion parameter included in each second action sequence belongs to the plurality of second reference values.

In an implementation, the sixth condition includes at least one of the following conditions: a value range of the acceleration of the ego vehicle at each of the plurality of first moments, a value range of a speed of the ego vehicle at each first moment, and a range of the difference between accelerations of the ego vehicle at the two adjacent first moments of the plurality of first moments. The acceleration of the ego vehicle at each first moment, the speed of the ego vehicle at each first moment, and the difference between the accelerations of the ego vehicle at the two adjacent first moments of the plurality of first moments are determined based on the second action sequence.

In an implementation, the value range of the acceleration of the ego vehicle at each first moment is determined based on a motor vehicle type.

In an implementation, the value range of the speed of the ego vehicle at each first moment is determined based on the motor vehicle type and/or intention information of a motion of the ego vehicle.

In an implementation, the intention information of the motion of the ego vehicle includes at least one of turning left at the intersection, turning right at the intersection, going straight at the intersection, entering the roundabout, and leaving the roundabout.

In an implementation, the policy determining apparatus further includes: a game object selection unit, configured to: obtain the initial motion trajectory of the ego vehicle based on the current location of the ego vehicle, the destination, and the road topology; obtain initial motion trajectories of a plurality of traffic participants based on respective current locations of the plurality of traffic participants and the road topology; and select, from the plurality of traffic participants, a traffic participant whose initial motion trajectory intersects the initial motion trajectory of the ego vehicle as a game object, to obtain the at least one game object.

For specific implementations, related descriptions, and technical effects of the foregoing units, refer to descriptions in the first aspect of embodiments of this application.

A third aspect of embodiments of this application provides a policy determining apparatus, including one or more processors and a memory. The memory stores computer-readable instructions. The one or more processors read the computer-readable instructions in the memory, so that the policy determining apparatus implements the method according to the first aspect and any possible implementation.

A fourth aspect of embodiments of this application provides a computer program product including instructions. When the computer program product is run on a computer, the computer is enabled to perform the method according to the first aspect and any possible implementation.

A fifth aspect of embodiments of this application provides a computer-readable storage medium including instructions. When the instructions are run on a computer, the computer is enabled to perform the method according to the first aspect and any possible implementation.

A sixth aspect of embodiments of this application provides a chip, including one or more processors. Some or all of the processors are configured to read and execute a computer program stored in a memory, to perform the method in any possible implementation of the first aspect.

In some embodiments, the chip includes the memory. The memory is connected to the processor through a circuit or a wire. Further, the chip further includes a communication interface. The processor is connected to the communication interface. The communication interface is configured to receive data and/or information to be processed. The processor obtains the data and/or information from the communication interface, processes the data and/or information, and outputs a processing result through the communication interface. The communication interface may be an input/output interface.

In some implementations, some of the one or more processors may implement some steps in the foregoing method by using dedicated hardware. For example, processing related to a neural network model may be implemented by a dedicated neural network processor or graphics processing unit.

The method provided in embodiments of this application may be implemented by one chip, or may be cooperatively implemented by a plurality of chips.

A seventh aspect of embodiments of this application provides a vehicle. The vehicle includes the apparatus in any possible implementation of the second aspect.

BRIEF DESCRIPTION OF DRAWINGS

FIG. 4 is a schematic flowchart of selecting a game object according to an embodiment of this application;

FIG. 5 is an example diagram of determining a driving policy according to an embodiment of this application;

DESCRIPTION OF EMBODIMENTS

The following describes in detail technical solutions in embodiments of this application with reference to the accompanying drawings in embodiments of this application.

Whether a self-driving technology is advanced depends on effectiveness of a driving policy. Therefore, a good driving policy is particularly important. If the driving policy is generated based on a pre-designed rule, because a generalization capability of the rule is poor, in a complex interaction scenario, effect of generating the driving policy based on the rule is poor, and vehicle collision, traffic congestion, or another problem may be caused.

Therefore, an idea of the game theory is introduced in a process of determining the driving policy. The game theory may also be referred to as a countermeasure theory or theory of games, and is a subject that studies a policy of a related party and implements a corresponding policy in a game between a plurality of individuals or teams under a specific constraint. The game theory is a mathematical theory and method for studying phenomena of struggle or competition. It mainly studies interaction between formulated incentive structures. The game theory considers predicted and actual behaviors of the individuals in the scenario and studies their optimization policies.

The plurality of individuals or teams may also be referred to as a plurality of game objects. In the interaction scenario of the embodiments of this application, from a perspective of an ego vehicle, the game object is another traffic participant that interacts with the ego vehicle.

Figure 1:
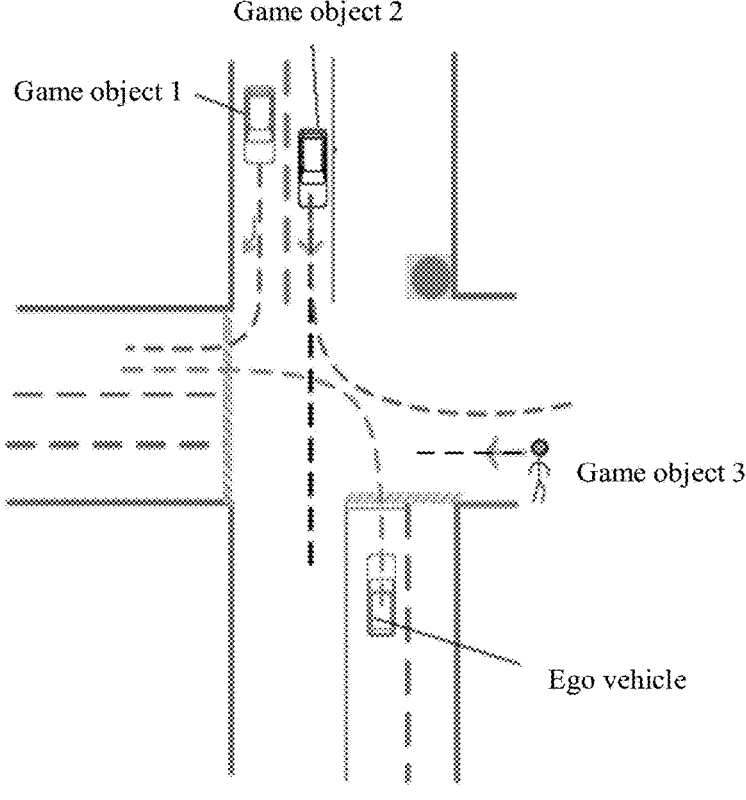
FIG. 1 is a schematic diagram of a scenario to which a policy determining method is applied according to an embodiment of this application.

A scenario shown in FIG. 1 is used as an example. From the perspective of the ego vehicle, the game objects include a game object 1, a game object 2, and a game object 3. The game object 1 and the game object 2 are vehicles. The game object 3 is a pedestrian. It can be learned, based on respective travel trajectories of the ego vehicle, the game object 1, the game object 2, and the game object 3 indicated by arrows in FIG. 1, that the ego vehicle may collide with the game object 1, the game object 2, and the game object 3. Therefore, a driving policy of the ego vehicle may be determined by using the idea of the game theory.

Embodiments of this application provide a policy determining method. In the method, the idea of the game theory is used, and not only interaction between the ego vehicle and another traffic participant may be considered, but also interaction between other traffic participants may be considered. Therefore, embodiments of this application are not only applicable to interaction between the ego vehicle and one traffic participant, but also applicable to interaction between the ego vehicle and a plurality of traffic participants.

Figure 2:
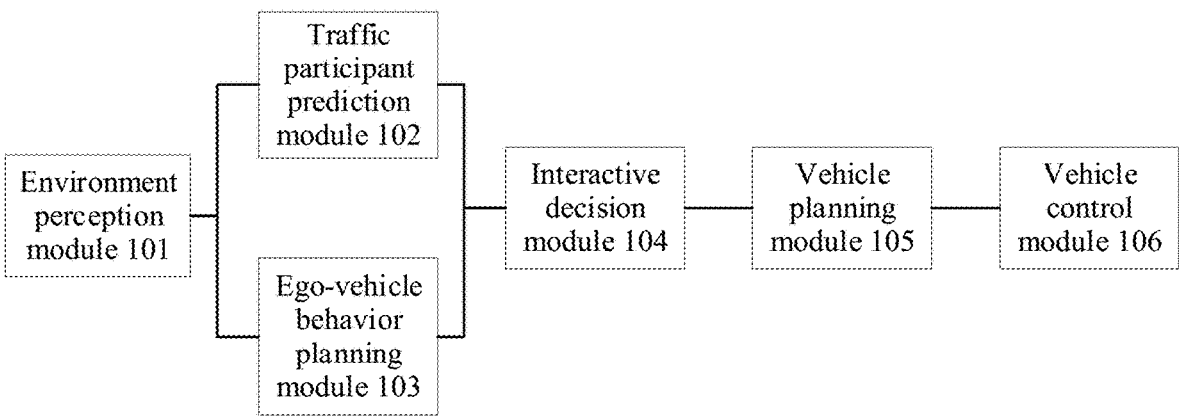
FIG. 2 is a schematic diagram of a system architecture to which a policy determining method is applied according to an embodiment of this application.

The method provided in embodiments of this application may be applied to a system architecture shown in FIG. 2. As shown in FIG. 2, this system includes an environment perception module 101, a traffic participant prediction module 102, an ego-vehicle behavior planning module 103, an interactive decision module 104, a vehicle planning module 105, and a vehicle control module 106.

The environment perception module 101 is configured to obtain status information of the ego vehicle and environment information around the ego vehicle by using a sensor. The status information of the ego vehicle includes information such as a current location, a current speed, a current acceleration, and a course angle of the ego vehicle. The environment information around the ego vehicle includes a road topology and status information of the traffic participant. The status information of the traffic participant includes information such as a current location and a current speed of the traffic participant.

The current location may be understood as a location at a specific moment. For example, when the policy needs to be determined, locations of the ego vehicle and the traffic participant are collected. In this case, the current location of the ego vehicle may be understood as a location of the ego vehicle at a collection moment of the sensor. The collection moment of the sensor may be a specific moment after the method provided in embodiments of this application starts to be performed, or may be a specific moment before the method provided in embodiments of this application starts to be performed.

It should be noted that for the ego vehicle, the current location mentioned below is a same location; for any traffic participant, the current location mentioned below is a same location; and for any object, the current location mentioned below is a same location.

Correspondingly, the environment perception module 101 may include a Global Positioning System (GPS), a laser sensor, a radar sensor, and the like. The global positioning system is configured to determine the current location of the ego vehicle and the current location of the traffic participant. The laser sensor and the radar sensor are configured to measure the current acceleration, the current speed, and the course angle of the ego vehicle, the current speed of the traffic participant, and the like.

The road topology may be understood as a diagram of a relationship between roads.

The traffic participant prediction module 102 is configured to predict intention information of a motion of the traffic participant and a future motion trajectory based on the status information of the traffic participant and the road topology that are obtained by the environment perception module 101. The intention information of the motion of the traffic participant may include turning left at an intersection, turning right at the intersection, going straight at the intersection, or the like. The future motion trajectory may be represented by a group of road points with timestamps. The road point with the timestamp indicates a location of the traffic participant at a specific moment.

It should be noted that the traffic participant prediction module 102 may determine the intention information of the motion of the traffic participant and the future trajectory by measuring locations of the traffic participant at a plurality of historical moments.

The ego-vehicle behavior planning module 103 is configured to plan a motion trajectory of the ego vehicle based on a destination, and the status information of the ego vehicle and the road topology that are obtained by the environment perception module 101. The motion trajectory of the ego vehicle may also be represented by a group of road points with timestamps. The road point with the timestamp indicates a location of the ego vehicle at a specific moment.

The interactive decision module 104 is configured to determine the driving policy of the ego vehicle based on a prediction result of the traffic participant prediction module 102 and a planning result of the ego-vehicle behavior planning module 103 by using the method provided in embodiments of this application.

The vehicle planning module 105 is configured to output action instruction information of the ego vehicle based on the driving policy output by the interactive decision module 104 and the road topology.

The vehicle control module 106 is configured to control, based on the action instruction information output by the vehicle planning module 105, the ego vehicle to complete self-driving.

It should be noted that embodiments of this application may be applied to not only a traffic scenario, but also another interaction scenario in which there are a plurality of mobile apparatuses.

For example, in a factory, there are a plurality of working robots that move automatically, and any one of the plurality of working robots may move in an automatic moving process by using the method provided in embodiments of this application.

For another example, in a travel process of a motorcade including a plurality of automobiles, each automobile in the motorcade may implement self-driving by using the method provided in embodiments of this application.

The following describes the policy determining method provided in embodiments of this application.

Figure 3:
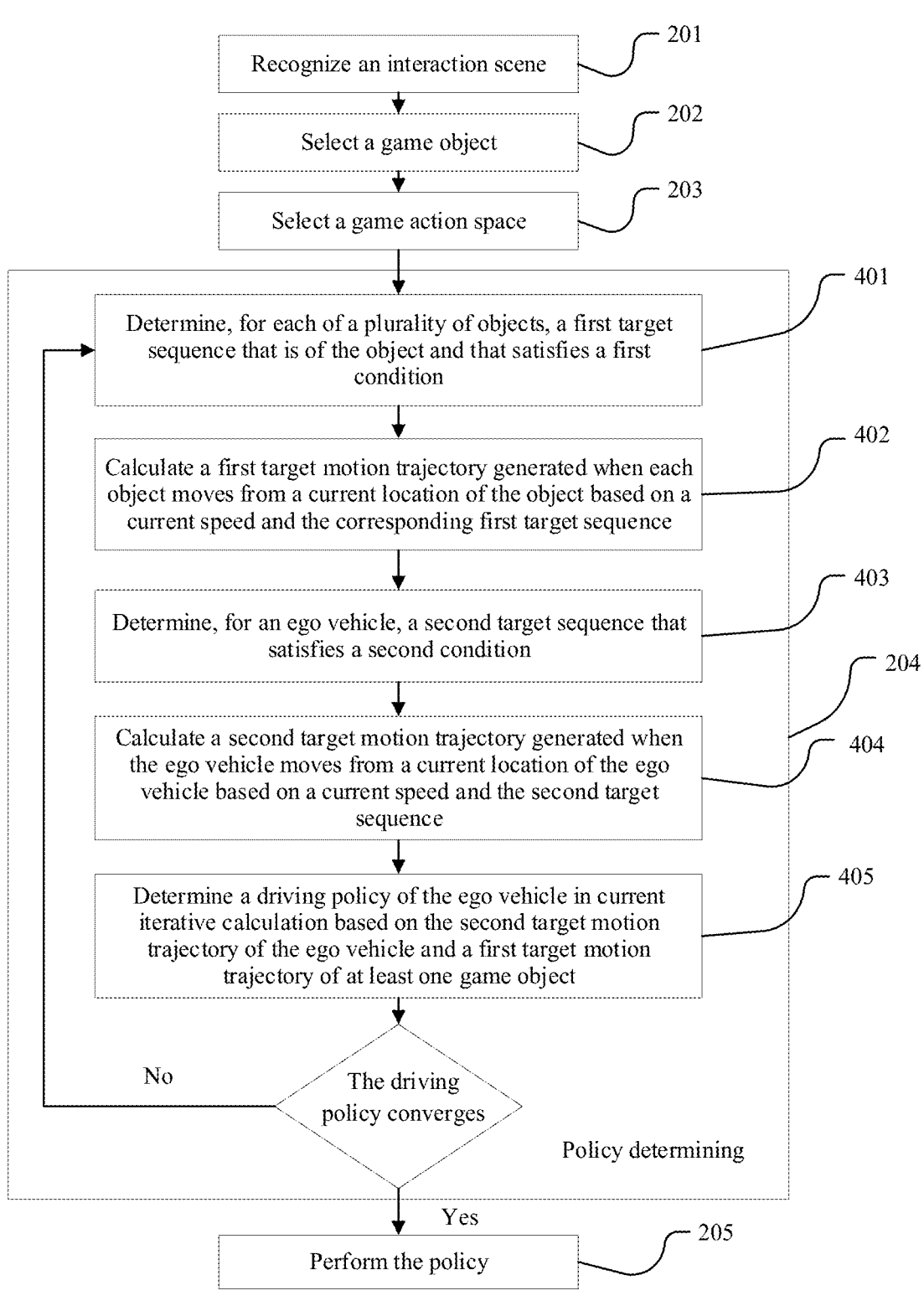
FIG. 3 is a schematic flowchart of a policy determining method according to one embodiment of embodiments of this application.

As shown in FIG. 3, embodiments of this application provide an embodiment of the policy determining method. This embodiment includes step 201 to step 205. Details are as follows.

Step 201: Recognize an interaction scenario.

In some embodiments, the interaction scenario may be recognized based on a road topology, intention information of a motion of a traffic participant, and intention information of a motion of an ego vehicle. In this embodiment, the interaction scenario may also be referred to as a scenario in which there is an interactive game behavior between the ego vehicle and the traffic participant.

The interaction scenario may be a traffic scenario, for example, turning at an intersection, entering a ramp, entering a roundabout, leaving a roundabout, or changing a lane. The traffic participant may include at least one of a pedestrian, a motor vehicle, and a non-motor vehicle. The non-motor vehicle includes a bicycle, an electric vehicle, and the like.

The interaction scenario shown in FIG. 1 is used as an example. A location of an intersection in FIG. 1 may be determined based on the road topology. A distance between the ego vehicle and the intersection shown in FIG. 1 is measured by the environment perception module 101. When the distance is less than a preset distance, it may be determined that the ego vehicle enters the interaction scenario. If the interaction scenario needs to be more accurately recognized, after it is determined that the distance is less than the preset distance, the interaction scenario may be determined based on the intention information of the traffic participant and the intention information of the motion of the ego vehicle. The ego vehicle, the game object 1, the game object 2, and the game object 3 all enter the intersection, and the intersection can be more accurately recognized as the interaction scenario. In addition, for the ego vehicle, the interaction scenario is turning at the intersection.

Step 202: Select a game object.

It may be understood that in the interaction scenario, not all traffic participants may collide with the ego vehicle. Therefore, the game object are selected from all the traffic participants in the interaction scenario. It should be noted that there are a plurality of methods for selecting the game object. This is not limited in this embodiment of this application.

For example, as shown in FIG. 4, step 202 includes the following steps.

Step 301: Obtain an initial motion trajectory of the ego vehicle based on a current location of the ego vehicle, a destination, and the road topology.

The current location of the ego vehicle and the road topology may be obtained by using the environment perception module 101. The destination may be determined based on a user input.

The initial motion trajectory of the ego vehicle is represented in a plurality of manners, for example, may be represented by a line on a map, or may be represented by a group of road points with timestamps (indicating locations of the ego vehicle at a plurality of moments). The timestamps of the road points may be set based on an actual requirement. This is not limited in this embodiment of this application. Time intervals between timestamps of adjacent road points may be the same. For example, the timestamps of the group of road points may include a $1^{st}$ second, a $2^{nd}$ second, a $3^{rd}$ second, a $4^{th}$ second, a $5^{th}$ second, a $6^{th}$ second, and a $7^{th}$ second after a current moment. Alternatively, time intervals between timestamps of adjacent road points may also be different. For example, the timestamps of the group of road points may include a $1^{st}$ second, a $2^{nd}$ second, a $2.5^{th}$ second, a $3^{rd}$ second, a $3.5^{th}$ second, a $4^{th}$ second, a $4.5^{th}$ second, a $5^{th}$ second, a $6^{th}$ second, and a $7^{th}$ second after a current moment.

Step 302: Obtain initial motion trajectories of a plurality of traffic participants based on respective current locations of the plurality of traffic participants and the road topology.

The respective current locations of the plurality of traffic participants and the road topology may be obtained by the environment perception module 101.

Similarly, the initial motion trajectory of the traffic participant may also be represented in a plurality of manners, for example, may be represented by a line on the map, or may be represented by a group of road points with timestamps (indicating locations of the traffic participant at a plurality of moments). The timestamp of the road point is similar to the timestamp of the road point in related descriptions of step 301. For details, refer to the related descriptions of step 301.

It may be understood that a manner of representing the initial motion trajectory of the traffic participant is consistent with a manner of representing the initial motion trajectory of the ego vehicle. For details, refer to the related descriptions of step 301.

Step 303: Select, from the plurality of traffic participants, a traffic participant whose initial motion trajectory intersects the initial motion trajectory of the ego vehicle as a game object, to obtain at least one game object.

There are a plurality of methods for determining whether the initial motion trajectory of the ego vehicle intersects the initial motion trajectory of the traffic participant. This may be related to a method for representing the initial motion trajectory.

For example, if the initial motion trajectory is represented by a line, whether the initial motion trajectory of the ego vehicle intersects the initial motion trajectory of the traffic participant may be determined by determining whether a line corresponding to the ego vehicle intersects a line corresponding to the traffic participant on the map.

For another example, if the initial motion trajectory is represented by a group of road points with timestamps, whether the initial motion trajectory of the ego vehicle intersects the initial motion trajectory of the traffic participant may be determined by determining whether there is a same road point with a same timestamp for the ego vehicle and the traffic participant (that is, determining whether the ego vehicle and the traffic participant are at a same location at a same moment).

Step 203: Select a game action space.

It may be understood that in a policy determining process, parameters such as a speed and an acceleration are used for calculation. However, values of speeds and accelerations of the ego vehicle and the game object are limited. Therefore, the game action space may be understood as value ranges of the parameters such as the speed and the acceleration. The game action space may be set based on an actual requirement. The following describes the game action space.

Step 204: Determine a policy, where the policy is a driving policy of the ego vehicle.

The following describes the policy determining process. As shown in FIG. 3, the policy determining process includes step 401 to step 405.

Step 401: Determine, for each of a plurality of objects, a first target sequence that is of the object and that satisfies a first condition.

In the traffic scenario, the plurality of objects include the ego vehicle and the at least one game object. The game object may be selected in step 202. For example, a type of the at least one game object includes at least one of the pedestrian, the motor vehicle, and the non-motor vehicle.

It should be noted that the method provided in embodiments of this application may also be applied to a scenario other than the traffic scenario. Correspondingly, the plurality of objects may be not limited to the foregoing types, and the plurality of objects may be mobile apparatuses in an interactive game scenario. For example, in a factory in which there are a plurality of working robots that move automatically, the plurality of objects may be the plurality of working robots.

The first target sequence includes values of a motion parameter at a plurality of first moments after the object starts from a current location of the object.

The motion parameter may be a speed or an acceleration.

The plurality of first moments may be set based on an actual requirement. Time intervals between two adjacent first moments of the plurality of first moments may be the same or different. For example, the plurality of first moments may include the $1^{st}$ second, the $2^{nd}$ second, the $3^{rd}$ second, the $4^{th}$ second, the $5^{th}$ second, the $6^{th}$ second, and the $7^{th}$ second after the current moment. Alternatively, the plurality of moments may include the $1^{st}$ second, the $2^{nd}$ second, the $2.5^{th}$ second, the $3^{rd}$ second, the $3.5^{th}$ second, the $4^{th}$ second, and the $5^{th}$ second after the current moment.

The first condition is that the object does not collided, in a process of moving from the current location of the object based on a current speed and the first target sequence, with another object that is in the plurality of objects and that moves based on an initial motion trajectory of the another object.

That the object does not collide with the another object may be understood as that a distance between locations of the object and the another object at a same moment is greater than a specified distance. The specified distance may be adjusted based on an actual requirement. When the specified distance is 0, it may be understood that the object and the another object are not at a same location at the same time.

It can be learned from the foregoing description that the current location and the current speed of the object may be obtained by the environment perception module 101.

The following describes the first target sequence that satisfies the first condition.

In some embodiments, one object (referred to as a target object herein) in the plurality of objects is used as an example. The target object starts from a current location of each object based on a current speed, and moves based on a first target sequence. Locations of the target object at a plurality of second moments may be calculated based on the first target sequence and a dynamic model. Another object in the plurality of objects except the target object moves based on an initial motion trajectory of the another object. The initial motion trajectory includes locations of the another object at the plurality of second moments. If it is determined, based on the locations of the target object at the plurality of second moments and the initial motion trajectory of the another object in the plurality of objects except the target object, that the target object does not collide with the another object, the first target sequence of the target object satisfies the first condition.

In this embodiment of this application, the dynamic model may be understood as a relational model met by any plurality of parameters such as the speed, the acceleration, a displacement, and time in a motion process. Details are not described below. For example, the dynamic model may be a relational model met by the speed, the acceleration, and the time, or the dynamic model may be a relational model met by the speed, the displacement, and the time.

With reference to FIG. 1, the following further describes the first target sequence that satisfies the first condition.

In some embodiments, the plurality of objects includes the ego vehicle, the game object 1, the game object 2, and the game object 3. The game object 1 is used as an example. The game object 1 starts from a current location of the game object 1 at a current speed, and moves based on a first target sequence. Locations of the game object 1 at the plurality of second moments may be calculated based on the first target sequence and the dynamic model. The ego vehicle, the game object 2, and the game object 3 all move based on their respective initial motion trajectories. If it is determined, based on the locations of the game object 1 at the plurality of second moments and the respective initial motion trajectories of the ego vehicle, the game object 2, and the game object 3, that the game object 1 does not collide with the game object 1, the game object 2, and the game object 3, the first target sequence of the game object 1 satisfies the first condition.

In this embodiment, the plurality of second moments may also be set based on an actual requirement. For details, refer to related descriptions of the plurality of first moments. The plurality of second moments may be completely the same as the plurality of first moments, may be partially the same as the plurality of first moments, or may be totally different from the plurality of first moments. This is not limited in this embodiment of this application.

In the foregoing description, the initial motion trajectory of the object is mentioned. The following describes values of initial motion trajectories of the plurality of objects.

In some embodiments, the values of the initial motion trajectories of the plurality of objects may be related to an iteration count corresponding to current iterative calculation. Based on different iteration counts corresponding to current iterative calculation, there are two cases for the values of the initial motion trajectories of the plurality of objects.

In a first case, current iterative calculation is first iterative calculation, and values of the initial motion trajectory of the ego vehicle and an initial motion trajectory of each of the at least one game object in the plurality of objects are different.

For example, the initial motion trajectory of the ego vehicle is planned based on the current location of the ego vehicle, the destination, and the road topology. The initial motion trajectory of each of the at least one game object is determined based on a current location of each of the at least one game object and the road topology.

For a process of planning the initial motion trajectory of the ego vehicle, refer to related descriptions of step 301. For a process of determining the initial motion trajectory of each of the at least one game object, refer to related descriptions of step 302.

In a second case, current iterative calculation is $N^{th}$ iterative calculation, and the values of the initial motion trajectories of the plurality of objects are similar, where N is an integer greater than 1.

For example, the respective initial motion trajectories of the plurality of objects are respective first target motion trajectories of the plurality of target objects obtained through previous iterative calculation of current iterative calculation.

For example, if current iterative calculation is third iterative calculation, the respective initial motion trajectories of the objects are respective first target motion trajectories of the plurality of target objects obtained through second iterative calculation; or if current iterative calculation is fourth iterative calculation, the respective initial motion trajectories of the objects are respective first target motion trajectories of the plurality of target objects obtained through third iterative calculation.

It should be noted that there are a plurality of methods for determining the first target sequence that satisfies the first condition. This is described below.

Step 402: Calculate a first target motion trajectory generated when each object moves from the current location of the object based on the current speed and the corresponding first target sequence, where the first target motion trajectory includes locations of the object at the plurality of second moments.

It may be understood that for each object, the first target motion trajectory generated by a motion of the object may be calculated based on the current location and the current speed of the object, the corresponding first target sequence, and the dynamic model.

For example, the game object 2 in FIG. 1 is used as an example. The first target sequence includes accelerations at the $1^{st}$ second, the $2^{nd}$ second, the $3^{rd}$ second, the $4^{th}$ second, the $5^{th}$ second, the $6^{th}$ second, and the r second after the current moment. A speed and a location of the game object 2 at any moment after the current moment may be calculated based on a current location, a current speed, and a first target sequence of the game object 2, so that a first target motion trajectory generated by a motion of the game object 2 may be obtained.

In some embodiments, if the plurality of second moments are the $1^{st}$ second, the $2^{nd}$ second, the $3^{rd}$ second, the $4^{th}$ second, the $5^{th}$ second, the $6^{th}$ second, and the $7^{th}$ second after the current moment, speeds of the game object 2 at the $1^{st}$ second, the $2^{nd}$ second, the $3^{rd}$ second, the $4^{th}$ second, the $5^{th}$ second, the $6^{th}$ second, and the $7^{th}$ second after the current moment and locations of the game object 2 at the $1^{st}$ second, the $2^{nd}$ second, the $3^{rd}$ second, the $4^{th}$ second, the $5^{th}$ second, the $6^{th}$ second, and the $7^{th}$ second after the current moment may be calculated based on the current location, the current speed, and the first target sequence of the game object 2.

If the plurality of second moments are a $0.5^{th}$ second, the $1^{st}$ second, a $1.5^{th}$ second, the $2^{nd}$ second, the $2.5^{th}$ second, the $3^{rd}$ second, the $3.5^{th}$ second, the $4^{th}$ second, the $4.5^{th}$ second, the $5^{th}$ second, the $5.5^{th}$ second, the $6^{th}$ second, a $6.5^{th}$ second, and the $7^{th}$ second after the current moment, speeds of the game object 2 at the $0.5^{th}$ second, the $1^{st}$ second, the $1.5^{th}$ second, the $2^{nd}$ second, the $2.5^{th}$ second, the $3^{rd}$ second, the $3.5^{th}$ second, the $4^{th}$ second, the $4.5^{th}$ second, the $5^{th}$ second, the $5.5^{th}$ second, the $6^{th}$ second, the $6.5^{th}$ second, and the r second after the current moment and locations of the game object 2 at the $0.5^{th}$ second, the $1^{st}$ second, the $1.5^{th}$ second, the $2^{nd}$ second, the $2.5^{th}$ second, the $3^{rd}$ second, the $3.5^{th}$ second, the $4^{th}$ second, the $4.5^{th}$ second, the $5^{th}$ second, the $5.5^{th}$ second, the $6^{th}$ second, the $6.5^{th}$ second, and the r second after the current moment may be calculated based on the current location, the current speed, and the first target sequence of the game object 2.

It should be noted that for any object, the first target motion trajectory obtained through calculation in step 402 can only ensure that the object does not collide, in a process of moving based on the first target motion trajectory, with another object that moves based on an initial motion trajectory, but cannot ensure that the object does not collide with another object that moves based on a first target motion trajectory.

Based on this, if the driving policy of the ego vehicle is determined based on a first target motion trajectory of the ego vehicle and a first target motion trajectory of the game object, the determined driving policy may cause the ego vehicle to collide with the game object. Therefore, in this embodiment of this application, a second target motion trajectory of the ego vehicle is calculated through step 403 and step 404. In this way, in a process of moving based on the second target motion trajectory, the ego vehicle does not collide with the at least one game object that moves based on a first target motion trajectory of the at least one game object. The following describes step 403 and step 404 in detail.

Step 403: Determine, for the ego vehicle, a second target sequence that satisfies a second condition, where the second target sequence includes values of a motion parameter at the plurality of first moments after the ego vehicle starts from the current location of the ego vehicle, and the second condition is that the ego vehicle does not collide, in a process of moving from the current location of the ego vehicle based on a current speed and the second target sequence, with the at least one game object that moves based on the first target motion trajectory of the at least one game object.

That the ego vehicle does not collide with the game object may be understood as that a distance between locations of the ego vehicle and the game object at a same moment is greater than the specified distance. The specified distance may be adjusted based on the actual requirement. When the specified distance is 0, it may be understood that the ego vehicle and the game object are not at a same location at the same time.

It should be noted that a process of determining the second target sequence that corresponds to the ego vehicle and that satisfies the second condition is similar to a process of determining the first target sequence that corresponds to the object and that satisfies the first condition in step 401. For details, refer to related descriptions of step 401 to understand step 403.

Step 404: Calculate the second target motion trajectory generated when the ego vehicle moves from the current location of the ego vehicle based on the current speed and the second target sequence, where the second target motion trajectory includes locations of the ego vehicle at the plurality of second moments.

It should be noted that a process of calculating the second target motion trajectory of the ego vehicle is similar to a process of calculating the first target motion trajectory of the object in step 402. For details, refer to related descriptions of step 402 to understand step 404.

Step 405: Determine the driving policy of the ego vehicle in current iterative calculation based on the second target motion trajectory of the ego vehicle and the first target motion trajectory of the at least one game object.

The driving policy may contain a plurality of types of content. For example, the driving policy is one of non-yielding, yielding, or car-following. In addition, the driving policy may be driving at a constant speed, driving at a constant acceleration, or the like.

It should be noted that there are a plurality of methods for determining the driving policy. This is not limited in this embodiment of this application.

For example, if it is determined, based on the second target motion trajectory of the ego vehicle and the first target motion trajectory of the game object, that the ego vehicle passes through any same location earlier than the game object, it may be determined that the driving policy is non-yielding; or if it is determined, based on the second target motion trajectory of the ego vehicle and the first target motion trajectory of the game object, that the ego vehicle passes through any same location later than the game object, it may be determined that the driving policy is yielding.

As shown in FIG. 5, the game object 1 and the ego vehicle in FIG. 1 are used as an example. The ego vehicle and the game object 1 are objects of a same type. A first target motion trajectory of the game object 1 and the second target motion trajectory of the ego vehicle include three same locations, and the three same locations are a location A, a location B, and a location C. The current moment is used as a reference. If moments at which the ego vehicle passes through the location A, the location B, and the location C are sequentially the $4^{th}$ second, the $5^{th}$ second, and the $6^{th}$ second, and moments at which the game object 1 passes through the location A, the location B, and the location C are sequentially the $5^{th}$ second, the $6^{th}$ second, and the $7^{th}$ second, it may be determined that the driving policy is non-yielding; or if moments at which the ego vehicle passes through the location A, the location B, and the location C are sequentially the $4^{th}$ second, the $5^{th}$ second, and the $6^{th}$ second, and moments at which the game object 1 passes through the location A, the location B, and the location C are sequentially the $3^{rd}$ second, the $4^{th}$ second, and the $5^{th}$ second, it may be determined that the driving policy is yielding.

Step 401 to step 405 are repeatedly performed until the driving policy of the ego vehicle in current iterative calculation matches an initial driving policy, that is, the driving policy of the ego vehicle converges.

The method provided in this embodiment of this application is implemented through iterative calculation. Iterative calculation is usually stopped after an iteration condition is satisfied. In this embodiment of this application, the iteration condition is that the driving policy of the ego vehicle in current iterative calculation matches the initial driving policy.

In some embodiments, a value of the initial driving policy may be related to the iteration count corresponding to current iterative calculation. Based on different iteration counts corresponding to current iterative calculation, there are two cases for the value of the initial driving policy. This is described below.

In a first case, current iterative calculation is first iterative calculation, and the initial driving policy may be a preset driving policy or a driving policy manually entered by the user.

In a second case, current iterative calculation is $N^{th}$ iterative calculation, and the initial driving policy is a driving policy in previous iterative calculation of current iterative calculation, where N is an integer greater than 1.

It should be noted that there are a plurality of methods for determining that the driving policy of the ego vehicle in current iterative calculation matches the initial driving policy. This is not limited in this embodiment of this application, and may be related to content of the driving policy. For example, when the driving policy is non-yielding, yielding, or car-following, if the driving policy of the ego vehicle in current iterative calculation is the same as the initial driving policy, it indicates that the driving policy of the ego vehicle in current iterative calculation matches the initial driving policy. When the driving policy includes parameters such as a driving speed or acceleration, if a difference between a parameter value included in the driving policy of the ego vehicle in current iterative calculation and a parameter value included in the initial driving policy is less than a third threshold, it indicates that the driving policy of the ego vehicle in current iterative calculation matches the initial driving policy. The third threshold may be set based on an actual requirement.

Step 205: Perform the policy.

Step 205 may be understood as outputting the action instruction information of the ego vehicle based on the driving policy and the road topology, and controlling, based on the action instruction information, the ego vehicle to complete self-driving.

It can be learned from related descriptions of step 401 that there are a plurality of methods for determining the first target sequence that satisfies the first condition. This is described below.

Figure 6:
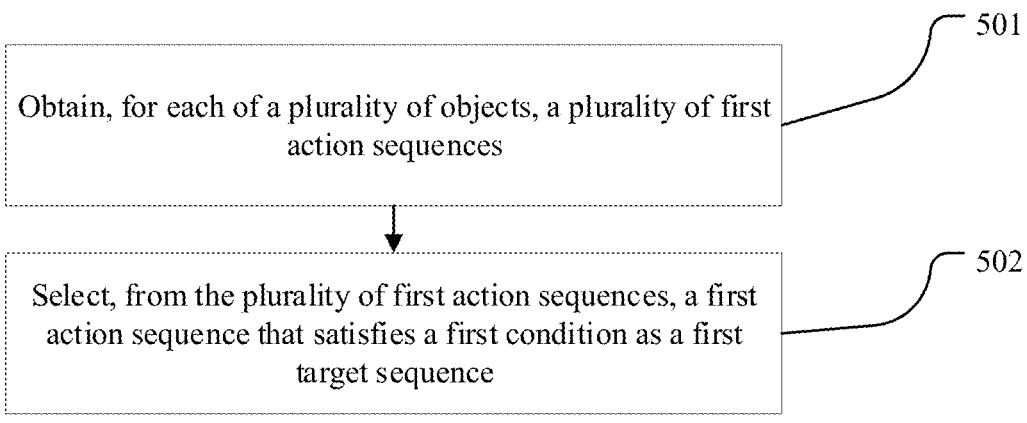
FIG. 6 is a schematic flowchart of determining a first target sequence according to an embodiment of this application.

For example, as shown in FIG. 6, step 401 includes the following steps.

Step 501: Obtain, for each of the plurality of objects, a plurality of first action sequences, where each of the plurality of first action sequences includes the values of the motion parameter at the plurality of first moments after the object starts from the current location of the object.

Step 501 includes: for each of the plurality of objects, obtaining, based on a plurality of first reference values of the motion parameter, the plurality of first action sequences that satisfy a fourth condition. The value of the motion parameter included in each first action sequence belongs to the plurality of first reference values.

The fourth condition is not limited in this embodiment of this application. For example, the fourth condition includes at least one of the following conditions: a value range of an acceleration of the object at each of the plurality of first moments, a value range of a speed of the object at each first moment, and a range of a difference between accelerations of the object at two adjacent first moments of the plurality of first moments. The acceleration of the object at each first moment, the speed of the object at each first moment, and the difference between the accelerations of the object at the two adjacent first moments of the plurality of first moments are determined based on the first action sequence.

For the fourth condition, a process of determining that the first action sequence satisfies the fourth condition may include: calculating, based on the values of the motion parameter in the first action sequence, accelerations of the object at the first moments, speeds of the object at the first moments, or the difference between the accelerations of the object at the two adjacent first moments of the plurality of first moments, and then determining, based on the corresponding value range, that the first action sequence satisfies the fourth condition.

It may be understood that for the ego vehicle and the traffic participant, the value of the acceleration, the value of the speed, and the difference between the accelerations at the two adjacent first moments have a specific range, and may be determined based on one or more factors.

For example, the value range of the acceleration of the object at each first moment is determined based on a type of the object.

The type of the object may be the pedestrian, the motor vehicle, or the non-motor vehicle.

It may be understood that different types of objects have different capabilities, and can provide different accelerations. Therefore, the value range of the acceleration of the object at the first moment is determined based on the type of the object. In this way, the first action sequence selected based on the value range of the acceleration of the object at the first moment matches a capability of the object of this type.

In some embodiments, due to hardware differences, accelerations that can be provided by the motor vehicle, the non-motor vehicle, and the pedestrian are different. The acceleration that can be provided by the motor vehicle is usually the largest, the acceleration that can be provided by the non-motor vehicle is the second largest, and the acceleration that can be provided by the pedestrian is usually the smallest.

For example, when the object is the motor vehicle, the value range of the acceleration at the first moment may be [−4, 3] m/s^2; when the object is a bicycle, the value range of the acceleration at the first moment may be [−2, 2] m/s^2; or when the object is a pedestrian, the value range of the acceleration at the first moment may be [−0.5, 0.8] m/s^2.

For example, the value range of the speed of the object at each first moment is determined based on the type of the object and/or intention information of a motion of the object.

The intention information of the motion of the object includes at least one of turning left at an intersection, turning right at the intersection, going straight at the intersection, entering a roundabout, and leaving the roundabout.

It may be understood that different types of objects have different capabilities, and can provide different speeds. Therefore, the value range of the speed of the object at the first moment is determined based on the type of the object. In this way, the first action sequence selected based on the value range of the speed of the object at the first moment matches a capability of the object of this type.

In some embodiments, due to hardware differences, speeds that can be provided by the motor vehicle, the non-motor vehicle, and the pedestrian are different. The speed that can be provided by the motor vehicle is usually the largest, the speed that can be provided by the non-motor vehicle is the second largest, and the speed that can be provided by the non-motor vehicle is usually the smallest.

In addition, different intention information has different speed requirements. Therefore, the value range of the speed of the object at the first moment is determined based on the intention information of the motion of the object. In this way, the first action sequence selected based on the value range of the speed of the object at the first moment meets a requirement of the intention information.

In some embodiments, the motor vehicle is used as an example. Speeds required for going straight at the intersection and turning right at the intersection may be different.

For example, when the type of the object is the motor vehicle, value ranges of speeds at which the motor vehicle turns left at the intersection, turns right at the intersection, and goes straight at the intersection may be [0, 35] kilometers per hour (km/h), [0, 25] km/h, and [0, 35] km/h. When the type of the object is a bicycle, value ranges of speeds at which the bicycle turns left at the intersection, turns right at the intersection, goes straight at the intersection, enters the roundabout, and leaves the roundabout are all [0, 16.2] km/h. When the type of the object is the pedestrian, value ranges of speeds of turning left at the intersection, turning right at the intersection, going straight at the intersection, entering the roundabout, and leaving the roundabout are all [0, 14.4] km/h.

The range of the difference between the accelerations of the object at the two adjacent first moments of the plurality of first moments may also be referred to as a jerk value range or a jerk constraint. The difference between the accelerations of the object at the two adjacent first moments of the plurality of first moments can reflect an acceleration speed of the object in a self-driving process, and can affect user experience in the self-driving process. Therefore, in this embodiment of this application, the range of the difference between the accelerations at the two adjacent first moments of the plurality of first moments is used to prevent the acceleration from changing excessively fast in the self-driving process, to improve user experience in the self-driving process.

The jerk constraint may be represented as $a_{t-1} - \text{Jerk} \leq a_t \leq a_{t-1} + \text{Jerk}$ where at represents an acceleration value at a moment t, $a_{t-1}$ represents an acceleration value at a moment t−1, and a value of Jerk may be adjusted based on an actual requirement. For example, in this embodiment of this application, the value of Jerk may be 7 m/s^3.

It should be noted that the value range of the acceleration, the value range of the speed, and the jerk value range included in the fourth condition are a part of the game action space.

The following describes a process of determining the plurality of first action sequences.

First, the plurality of first reference values of the motion parameter are set. The plurality of first reference values are also a part of the game action space.

Then, one of the plurality of first reference values is selected as the motion parameter at a $1^{st}$ first moment. Forward inference is performed based on a value of the motion parameter at the $1^{st}$ first moment, and a first reference value that satisfies the fourth condition is selected from the plurality of first reference values as a value of the motion parameter at a $2^{nd}$ first moment. Forward inference continues to be performed based on the value of the motion parameter at the $2^{nd}$ first moment, and a first reference value that satisfies the fourth condition is selected from the plurality of first reference values as a value of the motion parameter at a $3^{rd}$ first moment. The rest may be deduced by analogy, until one first action sequence is obtained.

In a forward inference process, the dynamic model may be used to infer the current location of the object, the speed of the object, and the like.

The plurality of first action sequences may be obtained by repeating the foregoing process.

It should be noted that the value of the motion parameter at each first moment selected through the foregoing process may be considered as a tree node, and the plurality of first action sequences may form a decision tree.

Step 502: Select, from the plurality of first action sequences, a first action sequence that satisfies the first condition as the first target sequence.

It should be noted that there may be a plurality of first action sequences that satisfy the first condition. When there are a plurality of first action sequences that satisfy the first condition, one first action sequence may be randomly selected as the first target sequence, or one first action sequence may be selected as the first target sequence based on a specific rule.

Figure 7:
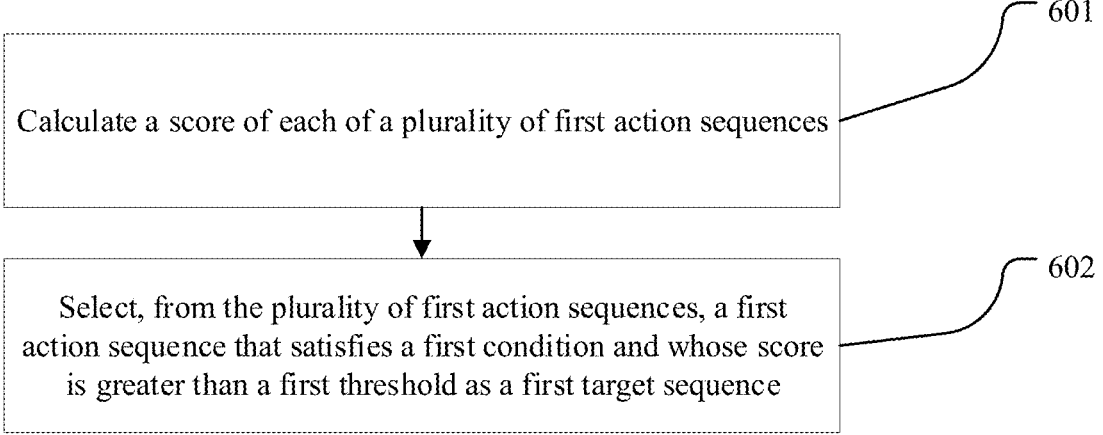
FIG. 7 is a schematic flowchart of selecting a first target sequence according to an embodiment of this application.

For example, as shown in FIG. 7, step 502 includes the following steps.

Step 601: Calculate a score of each of the plurality of first action sequences.

The score may also be referred to as a reward value.

It should be noted that there are a plurality of methods for calculating scores of the plurality of first action sequences. This is not limited in this embodiment of this application. The following describes two score calculation methods.

For example, step 601 includes: for each of the plurality of first action sequences, calculating, based on the first action sequence, the difference between the accelerations of the object at the two adjacent first moments of the plurality of first moments; and calculating the score of each first action sequence based on the difference between the accelerations at the two adjacent first moments in the plurality of first moments.

It should be noted that the difference between the accelerations at the two adjacent first moments can reflect comfort of self-driving. Therefore, in this embodiment, the score of the first action sequence is calculated based on the difference between the accelerations at the two adjacent first moments. In this way, the first target sequence selected based on the score can ensure comfort of the user in a self-driving process.

In some embodiments, absolute values of differences between accelerations at two adjacent first moments of the plurality of first moments may be accumulated, and then the score of the first action sequence is calculated based on an accumulation result.

For example, if accelerations of the object included in a first action sequence at the $1^{st}$ second, the $2^{nd}$ second, the $3^{rd}$ second, the $4^{th}$ second, the $5^{th}$ second, the $6^{th}$ second, and the $7^{th}$ second are 2 m/s^2, 3 m/s^2, 2 m/s^2, 1 m/s^2, 0 m/s^2, 1 m/s^2 and 0 m/s^2, differences between accelerations at two adjacent first moments are 1 m/s^2, 1 m/s^2, 1 m/s^2, 1 m/s^2, 1 m/s^2, and 1 m/s^2, and an accumulation result is 6 m/s^2. Finally, a score of the first action sequence may be calculated based on 6 m/s^2.

For example, the motion parameter is the acceleration. Correspondingly, step 601 includes: calculating the score of each first action sequence based on a value of the acceleration that is included in each of the plurality of first action sequences and that is at each first moment.

It should be noted that the value of the acceleration at the first moment can reflect a high speed of self-driving. Therefore, in this embodiment, the score of the first action sequence is calculated based on the value of the acceleration at the first moment. In this way, the first target sequence selected based on the score can control a self-driving speed.

In some embodiments, values of the acceleration at the plurality of first moments may be accumulated, and then the score of the first action sequence is calculated based on an accumulation result.

For example, if accelerations of the object included in a first action sequence at the $1^{st}$ second, the $2^{nd}$ second, the $3^{rd}$ second, the $4^{th}$ second, the $5^{th}$ second, the $6^{th}$ second, and the $7^{th}$ second are 2 m/s^2, 3 m/s^2, 2 m/s^2, 1 m/s^2, 0 m/s^2, 1 m/s^2 and 0 m/s^2, an accumulation result is 9 m/s^2. Finally, a score of the first action sequence may be calculated based on 9 m/s^2.

In addition, the foregoing two score calculation methods may be combined to calculate the score of the first action sequence. In some embodiments, for each of the plurality of first action sequences, the score of the first action sequence is calculated based on the difference between the accelerations at the two adjacent first moments and the value of an acceleration at each first moment.

In a calculation process, different weights may be further set for the difference between the accelerations at the two adjacent first moments and the value of the acceleration at each first moment.

For example, it can be learned based on the foregoing two examples that the accumulation result of the difference between the accelerations at the two adjacent first moments is 6 m/s^2, and the accumulation result of the value of the acceleration at the first moment is 9 m/s^2. In this case, the score of the first action sequence may be calculated based on k1*6 m/s^2+k2*9 m/s^2, where k1 and k2 are a weight for the difference between the accelerations at the two adjacent first moments and a weight for the value of the acceleration at each first moment. Values of k1 and k2 may be adjusted based on an actual requirement.

In addition, it should be noted that the score of the first action sequence may be alternatively calculated in another manner. For example, considering driving safety, because a time interval at which two objects pass through a same location can reflect the driving safety, the score of the first action sequence may be alternatively calculated based on a time interval at which the object moving based on the first action sequence and another object moving based on an initial motion trajectory pass through a same location.

Step 602: Select, from the plurality of first action sequences, a first action sequence that satisfies the first condition and whose score is greater than a first threshold as the first target sequence.

The first threshold may be set based on an actual requirement.

In some embodiments, one first action sequence may be randomly selected from a plurality of first action sequences whose scores are greater than the first threshold as the first target sequence.

The foregoing describes a process of obtaining the plurality of first action sequences. The following describes how to determine the second target sequence that satisfies the second condition.

Based on the foregoing embodiments, in another embodiment of the policy determining method provided in embodiments of this application, step 403 includes: obtaining, for the ego vehicle, a plurality of second action sequences, where each of the plurality of second action sequences includes the values of the motion parameter at the plurality of first moments after the ego vehicle starts from the current location of the ego vehicle; and selecting, from the plurality of second action sequences, the second action sequence that satisfies the second condition as the second target sequence.

For example, the selecting, from the plurality of second action sequences, the second action sequence that satisfies the second condition as the second target sequence includes: calculating a score of each of the plurality of second action sequences; and selecting, from the plurality of second action sequences, a second action sequence that satisfies the second condition and whose score is greater than a second threshold as the second target sequence.

For example, the calculating a score of each of the plurality of second action sequences includes: for each of the plurality of second action sequences, calculating, based on the second action sequence, a difference between accelerations of the ego vehicle at two adjacent first moments of the plurality of first moments; and calculating the score of each second action sequence based on the difference between the accelerations at the two adjacent first moments of the plurality of first moments.

For example, the motion parameter is the acceleration. Correspondingly, the calculating a score of each of the plurality of second action sequences includes: calculating the score of each second action sequence based on a value of the acceleration that is included in each of the plurality of first action sequences and that is at each first moment.

For example, the obtaining, for the ego vehicle, a plurality of second action sequences includes: for the ego vehicle, obtaining, based on a plurality of second reference values of the motion parameter, the plurality of second action sequences that satisfy a sixth condition, where the value of the motion parameter included in each second action sequence belongs to the plurality of second reference values.

For example, the sixth condition includes at least one of the following conditions: a value range of the acceleration of the ego vehicle at each of the plurality of first moments, a value range of a speed of the ego vehicle at each first moment, and a range of the difference between the accelerations of the ego vehicle at the two adjacent first moments of the plurality of first moments. The acceleration of the ego vehicle at each first moment, the speed of the ego vehicle at each first moment, and the difference between the accelerations of the ego vehicle at the two adjacent first moments of the plurality of first moments are determined based on the second action sequence.

For example, the value range of the acceleration of the ego vehicle at each first moment is determined based on a motor vehicle type.

For example, the value range of the speed of the ego vehicle at each first moment is determined based on the motor vehicle type and/or the intention information of the motion of the ego vehicle.

For example, the intention information of the motion of the ego vehicle includes at least one of turning left at the intersection, turning right at the intersection, going straight at the intersection, entering the roundabout, and leaving the roundabout.

It should be noted that a process of determining the second target sequence that satisfies the second condition is similar to the process of determining the first target sequence that satisfies the first condition. For details, refer to the foregoing process of determining the first target sequence that satisfies the first condition for understanding.

The foregoing describes in detail the policy determining method provided in embodiments of this application. In the self-driving process, the policy determining method provided in embodiments of this application may be used for a plurality of times to implement self-driving, to further ensure safety and comfort of self-driving. For example, the scenario shown in FIG. 1 is used as an example. Before the intersection is entered, a driving policy may be determined by using the policy determining method provided in embodiments of this application. After the intersection is entered, a driving policy may be determined again by using the policy determining method provided in embodiments of this application.

Figure 8:
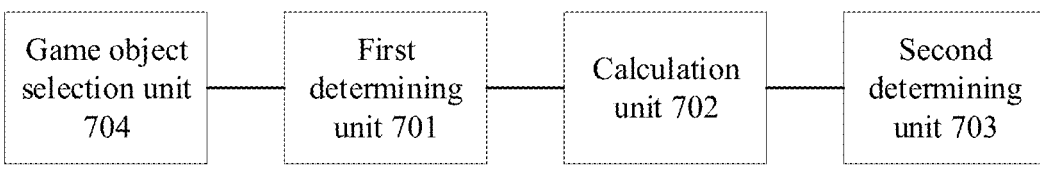
FIG. 8 is a schematic diagram of a structure of a policy determining apparatus according to one embodiment of embodiments of this application.

As shown in FIG. 8, embodiments of this application further provide an embodiment of a policy determining apparatus. This embodiment includes: a first determining unit 701, configured to determine, for each of a plurality of objects, a first target sequence that is of the object and that satisfies a first condition, where the first target sequence includes values of a motion parameter at a plurality of first moments after the object starts from a current location of the object, the first condition is that the object does not collide, in a process of moving from the current location of the object based on a current speed and the first target sequence, with another object that is in the plurality of objects and that moves based on an initial motion trajectory of the another object, the initial motion trajectory includes locations of the another object at a plurality of second moments, and the plurality of objects include an ego vehicle and at least one game object; a calculation unit 702, configured to calculate a first target motion trajectory generated when each object moves from the current location of the object based on the current speed and the corresponding first target sequence, where the first target motion trajectory includes locations of the object at the plurality of second moments; the first determining unit 701 is further configured to determine, for the ego vehicle, a second target sequence that satisfies a second condition, where the second target sequence includes values of a motion parameter at the plurality of first moments after the ego vehicle starts from a current location of the ego vehicle, and the second condition is that the ego vehicle does not collide, in a process of moving from the current location of the ego vehicle based on a current speed and the second target sequence, with the at least one game object that moves based on a first target motion trajectory of the at least one game object; and the calculation unit 702 is further configured to calculate a second target motion trajectory generated when the ego vehicle moves from the current location of the ego vehicle based on the current speed and the second target sequence, where the second target motion trajectory includes locations of the ego vehicle at the plurality of second moments; and a second determining unit 703, configured to determine a driving policy of the ego vehicle in current iterative calculation based on the second target motion trajectory of the ego vehicle and the first target motion trajectory of the at least one game object.

In an implementation, the motion parameter is an acceleration.

In an implementation, a type of the at least one game object includes at least one of a pedestrian, a motor vehicle, and a non-motor vehicle.

In an implementation, an initial motion trajectory of the ego vehicle is planned based on the current location of the ego vehicle, a destination, and a road topology. An initial motion trajectory of each of the at least one game object is determined based on a current location of each of the at least one game object and the road topology.

In an implementation, respective initial motion trajectories of the plurality of objects are respective first target motion trajectories of the plurality of target objects obtained through previous iterative calculation of current iterative calculation.

In an implementation, the driving policy is one of non-yielding, yielding, or car-following.

In an implementation, the initial driving policy is a driving policy in previous iterative calculation of current iterative calculation.

In an implementation, the first determining unit 701 is configured to: obtain, for each of the plurality of objects, a plurality of first action sequences, where each of the plurality of first action sequences includes the values of the motion parameter at the plurality of first moments after the object starts from the current location of the object; and select, from the plurality of first action sequences, a first action sequence that satisfies the first condition as the first target sequence.

In an implementation, the first determining unit 701 is configured to: calculate a score of each of the plurality of first action sequences; and select, from the plurality of first action sequences, a first action sequence that satisfies the first condition and whose score is greater than a first threshold as the first target sequence.

In an implementation, the first determining unit 701 is configured to: for each of the plurality of first action sequences, calculate, based on the first action sequence, a difference between accelerations of the object at two adjacent first moments of the plurality of first moments; and calculate the score of each first action sequence based on the difference between the accelerations at the two adjacent first moments of the plurality of first moments.

In an implementation, the motion parameter is the acceleration. The first determining unit 701 is configured to calculate the score of each first action sequence based on a value of the acceleration that is included in each of the plurality of first action sequences and that is at each first moment.

In an implementation, the first determining unit 701 is configured to: for each of the plurality of objects, obtain, based on a plurality of first reference values of the motion parameter, the plurality of first action sequences that satisfy a fourth condition. The value of the motion parameter included in each first action sequence belongs to the plurality of first reference values.

In an implementation, the fourth condition includes at least one of the following conditions: a value range of the acceleration of the object at each of the plurality of first moments, a value range of a speed of the object at each first moment, and a range of the difference between the accelerations of the object at the two adjacent first moments of the plurality of first moments. The acceleration of the object at each first moment, the speed of the object at each first moment, and the difference between the accelerations of the object at the two adjacent first moments of the plurality of first moments are determined based on the first action sequence.

In an implementation, the value range of the acceleration of the object at each first moment is determined based on a type of the object.

In an implementation, the value range of the speed of the object at each first moment is determined based on the type of the object and/or intention information of a motion of the object.

In an implementation, the intention information of the motion of the object includes at least one of turning left at an intersection, turning right at the intersection, going straight at the intersection, entering a roundabout, and leaving the roundabout.

In an implementation, the first determining unit 701 is configured to: obtain, for the ego vehicle, a plurality of second action sequences, where each of the plurality of second action sequences includes the values of the motion parameter at the plurality of first moments after the ego vehicle starts from the current location of the ego vehicle; and select, from the plurality of second action sequences, a second action sequence that satisfies the second condition as the second target sequence.

In an implementation, the first determining unit 701 is configured to: calculate a score of each of the plurality of second action sequences; and select, from the plurality of second action sequences, a second action sequence that satisfies the second condition and whose score is greater than a second threshold as the second target sequence.

In an implementation, the first determining unit 701 is configured to: for each of the plurality of second action sequences, calculate, based on the second action sequence, a difference between accelerations of the object at two adjacent first moments of the plurality of first moments; and calculate the score of each second action sequence based on the difference between the accelerations at the two adjacent first moments of the plurality of first moments.

In an implementation, the motion parameter is the acceleration. The first determining unit 701 is configured to calculate the score of each second action sequence based on a value of the acceleration that is included in each of the plurality of second action sequences and that is at each first moment.

In an implementation, the plurality of second action sequences that satisfy a sixth condition are obtained for the ego vehicle based on a plurality of second reference values of the motion parameter. The value of the motion parameter included in each second action sequence belongs to the plurality of second reference values.

In an implementation, the sixth condition includes at least one of the following conditions: a value range of the acceleration of the ego vehicle at each of the plurality of first moments, a value range of a speed of the ego vehicle at each first moment, and a range of the difference between the accelerations of the ego vehicle at the two adjacent first moments of the plurality of first moments. The acceleration of the ego vehicle at each first moment, the speed of the ego vehicle at each first moment, and the difference between the accelerations of the ego vehicle at the two adjacent first moments of the plurality of first moments are determined based on the second action sequence.

In an implementation, the value range of the acceleration of the ego vehicle at each first moment is determined based on a motor vehicle type.

In an implementation, the value range of the speed of the ego vehicle at each first moment is determined based on the motor vehicle type and/or intention information of a motion of the ego vehicle.

In an implementation, the intention information of the motion of the ego vehicle includes at least one of turning left at the intersection, turning right at the intersection, going straight at the intersection, entering the roundabout, and leaving the roundabout.

In an implementation, the policy determining apparatus further includes: a game object selection unit 704, configured to: obtain the initial motion trajectory of the ego vehicle based on the current location of the ego vehicle, the destination, and the road topology; obtain initial motion trajectories of a plurality of traffic participants based on respective current locations of the plurality of traffic participants and the road topology; and select, from the plurality of traffic participants, a traffic participant whose initial motion trajectory intersects the initial motion trajectory of the ego vehicle as a game object, to obtain the at least one game object.

For specific implementations, related descriptions, and technical effects of the foregoing units, refer to descriptions of the method in embodiments of this application.

Figure 9:
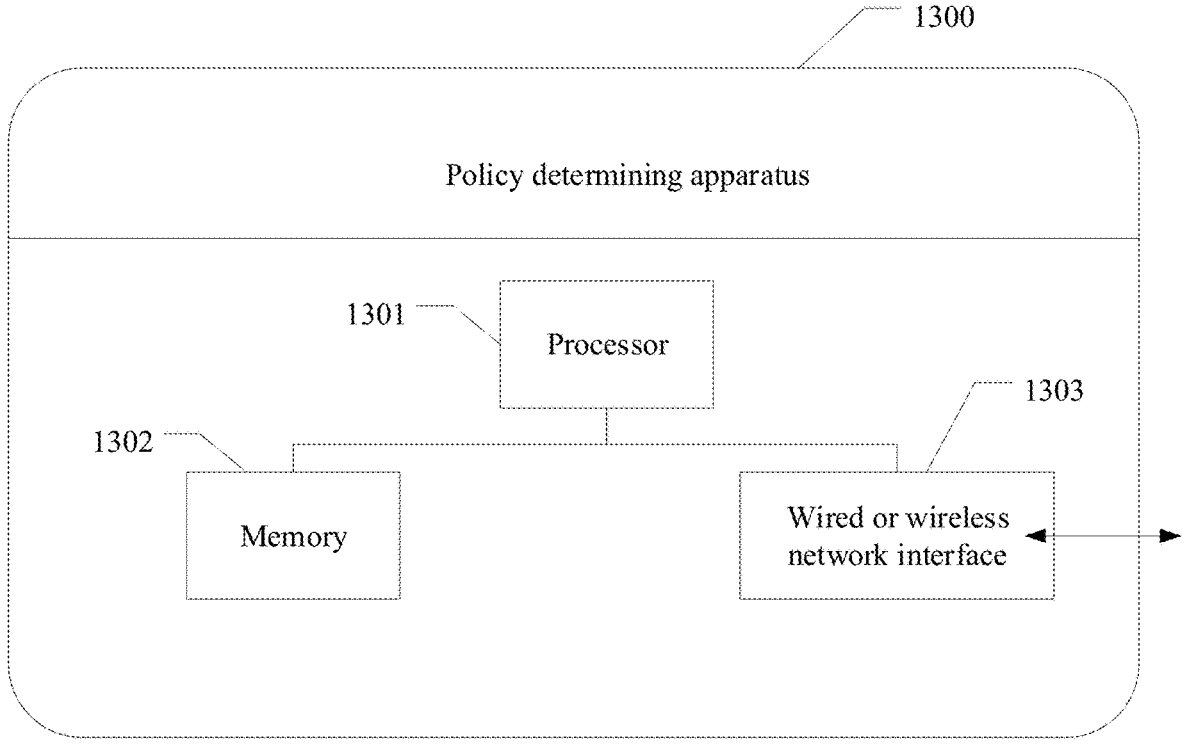
FIG. 9 is a schematic diagram of a structure of a policy determining apparatus according to another embodiment of embodiments of this application.

FIG. 9 is a schematic diagram of the policy determining apparatus according to an embodiment of embodiments this application.

The policy determining apparatus 1300 in this embodiment of this application may be an apparatus configured on a mobile platform (for example, an automobile or a robot).

The policy determining apparatus 1300 may differ greatly due to different configurations or performance, and may include one or more processors 1301 and a memory 1302. The memory 1302 stores a program or data.

The memory 1302 may be a volatile memory or a nonvolatile memory. In some embodiments, the processor 1301 is one or more central processing units (CPUs). The CPU may be a single-core CPU, or may be a multi-core CPU. The processor 1301 may communicate with the memory 1302, and execute, on the policy determining apparatus 1300, a series of instructions in the memory 1302.

The policy determining apparatus 1300 further includes one or more wired or wireless network interfaces 1303, for example, an ethernet interface.

In some embodiments, although not shown in FIG. 9, the policy determining apparatus 1300 may further include one or more power supplies and one or more input/output interfaces. The input/output interface may be configured to connect a camera, a display, a mouse, a keyboard, a touchscreen device, a sensing device, or the like. The input/output interface is an optional component, and may or may not exist. This is not limited herein.

For a process performed by the processor 1301 in the policy determining apparatus 1300 in this embodiment, refer to the process of the method described in the foregoing method embodiments. Details are not described herein again.

The policy determining apparatus 1300 may be a vehicle with a self-driving function, or another component with a self-driving function. The policy determining apparatus 1300 includes but is not limited to another sensor, for example, a vehicle-mounted terminal, a vehicle-mounted controller, a vehicle-mounted module, a vehicle-mounted module assembly, a vehicle-mounted component, a vehicle-mounted chip, a vehicle-mounted unit, a vehicle-mounted radar, or a vehicle-mounted camera. The vehicle may implement the method provided in this application by using the vehicle-mounted terminal, the vehicle-mounted controller, the vehicle-mounted module, the vehicle-mounted module assembly, the vehicle-mounted component, the vehicle-mounted unit, or the vehicle-mounted radar or camera.

Alternatively, the policy determining apparatus 1300 may be an intelligent terminal with a self-driving function other than a vehicle, may be disposed in an intelligent terminal with a self-driving function other than a vehicle, or may be disposed in a component of an intelligent terminal. The intelligent terminal may be another terminal device, for example, an intelligent transportation device, a smart household device, or a robot. The policy determining apparatus 1300 includes but is not limited to the intelligent terminal, or another sensor, for example, a controller, a chip, a radar, or a camera, and another component in the intelligent terminal.

Alternatively, the policy determining apparatus 1300 may be a general-purpose device or a dedicated device. During specific implementation, the apparatus may alternatively be a desktop computer, a portable computer, a network server, a palmtop computer (personal digital assistant, PDA), a mobile phone, a tablet computer, a wireless terminal device, an embedded device, or another device with a processing function. A type of the policy determining apparatus 1300 is not limited in this embodiment of this application.

Alternatively, the policy determining apparatus 1300 may be a chip or a processor with a processing function. The policy determining apparatus 1300 may include a plurality of processors. The processor may be a single-core (single-CPU) processor, or may be a multi-core (multi-CPU) processor. The chip or processor with the processing function may be disposed in a sensor, or may be disposed not in a sensor but at a receiver of an output signal of the sensor.

Embodiments of this application further provide a system for use in unmanned driving or intelligent driving. The system includes the policy determining apparatus mentioned in the foregoing embodiments of this application and at least one of sensors such as a camera or a radar. At least one apparatus in the system may be integrated into a machine or a device. Alternatively, at least one apparatus in the system may be disposed as a separate element or apparatus.

Further, any foregoing system may interact with a central controller of a vehicle, to provide detection and/or fusion information for decision or control of driving of the vehicle.

Embodiments of this application further provide a vehicle. The vehicle includes at least one policy determining apparatus or any foregoing system mentioned in the foregoing embodiments of this application.

Embodiments of this application further provide a chip, including one or more processors. Some or all of the processors are configured to read and execute a computer program stored in a memory, to perform the method in the foregoing embodiments.

In some embodiments, the chip includes the memory. The memory is connected to the processor through a circuit or a wire. Further, the chip further includes a communication interface. The processor is connected to the communication interface. The communication interface is configured to receive data and/or information to be processed. The processor obtains the data and/or information from the communication interface, processes the data and/or information, and outputs a processing result through the communication interface. The communication interface may be an input/output interface.

In some implementations, some of the one or more processors may implement some steps in the foregoing method by using dedicated hardware. For example, processing related to a neural network model may be implemented by a dedicated neural network processor or graphics processing unit.

The method provided in embodiments of this application may be implemented by one chip, or may be cooperatively implemented by a plurality of chips.

Embodiments of this application further provide a computer storage medium. The computer storage medium is configured to store computer software instructions used by the foregoing computer device. The computer software instructions include a program designed for the computer device.

The computer device may be the policy determining apparatus described in FIG. 8.

Embodiments of this application further provide a computer program product. The computer program product includes computer software instructions. The computer software instructions may be loaded by a processor to implement the process in the method shown in the foregoing embodiments.

Embodiments of this application further provide a vehicle. The vehicle includes the policy determining apparatus described in FIG. 8.

It may be clearly understood by a person skilled in the art that for ease and brevity of description, for detailed working processes of the foregoing system, apparatus, and unit, reference may be made to corresponding processes in the foregoing method embodiment, and details are not described herein again.

What is claimed is:

1. A method, comprising:

determining, for each of a plurality of objects, a first target sequence that satisfies a first condition, wherein the first target sequence comprises values of a motion parameter at a plurality of first moments after an object of the plurality of objects starts moving from a current location of the object, wherein the first condition is that the object does not collide, in a process of moving from the current location of the object based on a current speed and the first target sequence, with other objects that are of the plurality of objects and that move based on an initial motion trajectory of the other objects, wherein the initial motion trajectory comprises locations of the other objects at a plurality of second moments, and wherein the plurality of objects comprises an ego vehicle and at least two game objects;

calculating a first target motion trajectory generated when each object moves from the current location of the object based on the current speed and the first target sequence, wherein the first target motion trajectory comprises locations of the object at the plurality of second moments;

determining, for the ego vehicle, a second target sequence that satisfies a second condition, wherein the second target sequence comprises values of the motion parameter at the plurality of first moments after the ego vehicle starts from a current location of the ego vehicle, and wherein the second condition is that the ego vehicle does not collide, in a process of moving from the current location of the ego vehicle based on a current speed and the second target sequence, with each of the at least two game objects that moves based on the first target motion trajectory of each of the at least two game objects;

calculating a second target motion trajectory generated when the ego vehicle moves from the current location of the ego vehicle based on the current speed and the second target sequence, wherein the second target motion trajectory comprises locations of the ego vehicle at the plurality of second moments;

determining a driving policy of the ego vehicle in a current iterative calculation based on the second target motion trajectory of the ego vehicle and the first target motion trajectory of each of the at least two game objects;

repeatedly performing the foregoing steps until the driving policy of the ego vehicle in the current iterative calculation matches an initial driving policy, outputting, when the driving policy matches the initial driving policy, action instruction information of the ego vehicle based on the driving policy and a road topology; and controlling, based on the action instruction information, the ego vehicle to complete self-driving.

2. The method of claim 1, wherein the motion parameter is acceleration.

3. The method of claim 1, wherein a type of the at least two game objects comprises at least one of a pedestrian, a motor vehicle, or a non-motor vehicle.

4. The method of claim 1, further comprising:

planning an initial motion trajectory of the ego vehicle based on the current location of the ego vehicle, a destination, and the road topology; and determining an initial motion trajectory of each of the at least two game objects based on a current location of each of the at least two game objects and the road topology.

5. The method of claim 1, wherein respective initial motion trajectories of the plurality of objects are respective first target motion trajectories of a plurality of target objects from a previous iterative calculation of a current iterative calculation.

6. The method of claim 1, wherein the driving policy is at least one of non-yielding, yielding, or car-following.

7. The method of claim 1, wherein the initial driving policy is a driving policy in a previous iterative calculation of the current iterative calculation.

8. The method of claim 1, wherein determining the first target sequence that satisfies the first condition comprises:

obtaining, for each of the plurality of objects, a plurality of first action sequences, wherein each of the plurality of first action sequences comprises the values of the motion parameter at the plurality of first moments after the object starts from the current location of the object; and selecting, from the plurality of first action sequences, a first action sequence that satisfies the first condition as the first target sequence.

9. The method of claim 8, wherein selecting the first action sequence that satisfies the first condition as the first target sequence comprises:

calculating a score of each of the plurality of first action sequences; and selecting, from the plurality of first action sequences, the first action sequence that satisfies the first condition and whose score is greater than a first threshold as the first target sequence.

10. The method of claim 9, wherein calculating the score of each of the plurality of first action sequences comprises:

calculating, for each of the plurality of first action sequences and based on the first action sequence, a difference between accelerations of the object at two adjacent first moments of the plurality of first moments; and calculating the score of each of the plurality of first action sequences based on the difference between the accelerations at the two adjacent first moments of the plurality of first moments.

11. The method of claim 9, wherein the motion parameter is acceleration, and wherein calculating the score of each of the plurality of first action sequences comprises calculating the score of each of the plurality of first action sequences based on a value of the acceleration that is comprised in each of the plurality of first action sequences and that is at each first moment.

12. The method of claim 8, wherein obtaining the plurality of first action sequences comprises obtaining, for each of the plurality of objects and based on a plurality of first reference values of the motion parameter, the plurality of first action sequences that satisfy a fourth condition, wherein the value of the motion parameter comprised in each of the plurality of first action sequences belongs to the plurality of first reference values, and wherein the fourth condition comprises at least one of the following conditions:

a value range of acceleration of the object at each of the plurality of first moments;

a value range of a speed of the object at each first moment; or a range of a difference between the accelerations of the object at two adjacent first moments of the plurality of first moments, wherein the acceleration of the object at each first moment, the speed of the object at each first moment, and the difference between the accelerations of the object at the two adjacent first moments of the plurality of first moments are based on the first action sequence.

13. The method of claim 12, wherein the value range of the acceleration of the object at each first moment is based on a type of the object.

14. The method of claim 12, further comprising determining the value range of the speed of the object at each first moment based on at least one of a type of the object or intention information of a motion of the object, wherein the intention information of the motion of the object comprises at least one of turning left at an intersection, turning right at the intersection, going straight at the intersection, entering a roundabout, or leaving the roundabout.

15. The method of claim 1, wherein determining the second target sequence that satisfies the second condition comprises:

obtaining, for the ego vehicle, a plurality of second action sequences, wherein each of the plurality of second action sequences comprises the values of the motion parameter at the plurality of first moments after the ego vehicle starts from the current location of the ego vehicle; and selecting, from the plurality of second action sequences, a second action sequence that satisfies the second condition as the second target sequence.

16. The method of claim 15, wherein selecting the second action sequence that satisfies the second condition as the second target sequence comprises:

calculating a score of each of the plurality of second action sequences; and selecting, from the plurality of second action sequences, a second action sequence that satisfies the second condition and whose score is greater than a second threshold as the second target sequence.

17. The method of claim 16, wherein calculating the score of each of the plurality of second action sequences comprises:

calculating, for each of the plurality of second action sequences and based on the second action sequence, a difference between accelerations of the ego vehicle at two adjacent first moments of the plurality of first moments; and calculating the score of each of the plurality of second action sequences based on the difference between the accelerations at the two adjacent first moments of the plurality of first moments.

18. The method of claim 16, wherein the motion parameter is acceleration, and wherein calculating the score of each of the plurality of second action sequences comprises calculating the score of each of the plurality of second action sequences based on a value of the acceleration that is comprised in each of the plurality of second action sequences and that is at each first moment.

19. A policy determining apparatus, comprising:

a memory configured to store programming instructions; and at least one processor coupled to the memory and configured to execute the programming instructions to cause the policy determining apparatus to:

determine, for each of a plurality of objects, a first target sequence that is of the object and that satisfies a first condition, wherein the first target sequence comprises values of a motion parameter at a plurality of first moments after an object of the plurality of objects starts moving from a current location of the object, wherein the first condition is that the object does not collide, in a process of moving from the current location of the object based on a current speed and the first target sequence, with another object that are of the plurality of objects and that move based on an initial motion trajectory of the another object, wherein the initial motion trajectory comprises locations of the another object at a plurality of second moments, and wherein the plurality of objects comprises an ego vehicle and at least two game objects;

calculate a first target motion trajectory generated when each object moves from the current location of the object based on the current speed and the first target sequence, wherein the first target motion trajectory comprises locations of the object at the plurality of second moments;

determine, for the ego vehicle, a second target sequence that satisfies a second condition, wherein the second target sequence comprises values of the motion parameter at the plurality of first moments after the ego vehicle starts from a current location of the ego vehicle, and wherein the second condition is that the ego vehicle does not collide, in a process of moving from the current location of the ego vehicle based on a current speed and the second target sequence, with each of the at least two game objects that moves based on the first target motion trajectory of each of the at least two game objects;

calculate a second target motion trajectory generated when the ego vehicle moves from the current location of the ego vehicle based on the current speed and the second target sequence, wherein the second target motion trajectory comprises locations of the ego vehicle at the plurality of second moments;

determine a driving policy of the ego vehicle in a current iterative calculation based on the second target motion trajectory of the ego vehicle and the first target motion trajectory of each of the at least two game objects;

repeatedly perform the foregoing steps until the driving policy of the ego vehicle in the current iterative calculation matches an initial driving policy;

output, when the driving policy matches the initial driving policy, action instruction information of the ego vehicle based on the driving policy and a road topology; and control, based on the action instruction information, the ego vehicle to complete self-driving.

20. A computer program product comprising computer-executable instructions stored on a non-transitory computer-readable storage medium that, when executed by a processor, cause an apparatus to:

determine, for each of a plurality of objects, a first target sequence that satisfies a first condition, wherein the first target sequence comprises values of a motion parameter at a plurality of first moments after an object of the plurality of objects starts moving from a current location of the object, wherein the first condition is that the object does not collide, in a process of moving from the current location of the object based on a current speed and the first target sequence, with other objects that are of the plurality of objects and that move based on an initial motion trajectory of the other objects, wherein the initial motion trajectory comprises locations of the other objects at a plurality of second moments, and wherein the plurality of objects comprises an ego vehicle and at least two game objects;

calculate a first target motion trajectory generated when each object moves from the current location of the object based on the current speed and the first target sequence, wherein the first target motion trajectory comprises locations of the object at the plurality of second moments;

determine, for the ego vehicle, a second target sequence that satisfies a second condition, wherein the second target sequence comprises values of the motion parameter at the plurality of first moments after the ego vehicle starts from a current location of the ego vehicle, and wherein the second condition is that the ego vehicle does not collide, in a process of moving from the current location of the ego vehicle based on a current speed and the second target sequence, with each of the at least two game objects that moves based on the first target motion trajectory of each of the at least two game objects;

calculate a second target motion trajectory generated when the ego vehicle moves from the current location of the ego vehicle based on the current speed and the second target sequence, wherein the second target motion trajectory comprises locations of the ego vehicle at the plurality of second moments;

determine a driving policy of the ego vehicle in a current iterative calculation based on the second target motion trajectory of the ego vehicle and the first target motion trajectory of each of the at least two game objects;

repeatedly perform the foregoing steps until the driving policy of the ego vehicle in the current iterative calculation matches an initial driving policy;

output, when the driving policy matches the initial driving policy, action instruction information of the ego vehicle based on the driving policy and a road topology; and control, based on the action instruction information, the ego vehicle to complete self-driving.

* * * * *